United States Patent
Fukumura et al.

(10) Patent No.: US 8,944,694 B2
(45) Date of Patent: Feb. 3, 2015

(54) BEARING DEVICE FOR DRIVING WHEEL, AND ITS ASSEMBLING METHOD

(75) Inventors: Yoshikazu Fukumura, Iwata (JP); Masayuki Kuroda, Takarazuka (JP); Hisaaki Kura, Iwata (JP); Shin Tomogami, Iwata (JP); Hiroshi Kawamura, Iwata (JP); Shigeaki Fukushima, Iwata (JP); Masahiro Ozawa, Iwata (JP); Yuichi Asano, Iwata (JP)

(73) Assignee: NTN Corporation, Osaka (JP)

( * ) Notice: Subject to any disclaimer, the term of this patent is extended or adjusted under 35 U.S.C. 154(b) by 256 days.

(21) Appl. No.: 12/529,240

(22) PCT Filed: Mar. 7, 2008

(86) PCT No.: PCT/JP2008/054191
§ 371 (c)(1), (2), (4) Date: Aug. 31, 2009

(87) PCT Pub. No.: WO2008/111525
PCT Pub. Date: Sep. 18, 2008

(65) Prior Publication Data
US 2010/0092122 A1 Apr. 15, 2010

(30) Foreign Application Priority Data

Mar. 7, 2007 (JP) .................. 2007-057518
Jul. 23, 2007 (JP) .................. 2007-191001

(51) Int. Cl.
*F16C 13/00* (2006.01)
*F16C 35/00* (2006.01)
(Continued)

(52) U.S. Cl.
CPC ......... *B06B 27/0094* (2013.01); *B60B 27/0005* (2013.01); *B60B 27/0026* (2013.01);
(Continued)

(58) Field of Classification Search
CPC ............ B60B 27/0005; B60B 27/0026; B60B 27/0042; B60B 27/0084; B60B 27/0094; F16D 1/0858; F16D 2001/103; F16D 2300/12; F16C 19/184–19/187; F16C 35/0635; F16C 2226/80; F16C 2326/02
USPC .......... 384/537, 539, 543, 544, 584, 586, 589
See application file for complete search history.

(56) References Cited

U.S. PATENT DOCUMENTS 4,881,842 A * 11/1989 Farrell et al. .................. 384/539
6,135,571 A * 10/2000 Mizukoshi et al. ........... 384/544
(Continued)

FOREIGN PATENT DOCUMENTS

CN 1856658 11/2006
EP 1 179 440 2/2002
(Continued)

OTHER PUBLICATIONS

Translation of JP06-312322 obtained Mar. 4, 2013.*
(Continued)

*Primary Examiner* — James Pilkington
(74) *Attorney, Agent, or Firm* — Wenderoth, Lind & Ponack, L.L.P.

(57) ABSTRACT

A bearing device for a driving wheel includes an outer race having an inner periphery in which double-row outer raceway surfaces are formed; a hub wheel and an inner race having outer peripheries in which double-row inner raceway surfaces opposed to the outer raceway surfaces are formed; and double-row rolling elements interposed between the outer raceway surfaces and the inner raceway surfaces. A shaft hole of the hub wheel is formed into a cylindrical shape, and a male spline is formed on an outer periphery of a stem section of the outer joint member so that the stem section of the outer joint member is press-fit into the shaft hole of the hub wheel. With this, recesses caused to fit on the male spline with interference are formed in the shaft hole of the hub wheel, whereby the hub wheel and the outer joint member are separably coupled to each other.

16 Claims, 19 Drawing Sheets

(51) Int. Cl.
| | |
|---|---|
| *B60B 27/00* | (2006.01) |
| *F16D 1/08* | (2006.01) |
| *F16D 3/224* | (2011.01) |
| *F16C 35/063* | (2006.01) |
| *F16D 1/10* | (2006.01) |
| *F16D 3/223* | (2011.01) |
| *F16C 19/18* | (2006.01) |

(52) U.S. Cl.
CPC ......... *B60B27/0042* (2013.01); *B60B 27/0084* (2013.01); *F16D 1/0858* (2013.01); *F16D 3/224* (2013.01); *F16C 35/0635* (2013.01); *F16D 2001/103* (2013.01); *F16D 2003/22326* (2013.01); *F16D 2300/12* (2013.01); *F16C 19/186* (2013.01)
USPC .......................................... 384/544; 384/589

(56) References Cited

U.S. PATENT DOCUMENTS

| | | | |
|---|---|---|---|
| 6,851,865 B2* | 2/2005 | Nomura et al. | 384/544 |
| 6,974,259 B2* | 12/2005 | Nomura et al. | 384/544 |
| 7,125,171 B2* | 10/2006 | Ouchi | 384/537 |
| 2001/0004611 A1 | 6/2001 | Sahashi et al. | |
| 2002/0025093 A1 | 2/2002 | Sahashi et al. | |
| 2002/0195291 A1* | 12/2002 | Nonogaki | 180/337 |
| 2004/0120622 A1* | 6/2004 | Tajima et al. | 384/544 |
| 2006/0171624 A1 | 8/2006 | Niebling et al. | |
| 2011/0056080 A1 | 3/2011 | Tajima et al. | |

FOREIGN PATENT DOCUMENTS

| | | | |
|---|---|---|---|
| EP | 1 375 196 | | 1/2004 |
| JP | 06-312322 | * | 11/1994 |
| JP | 2001-105806 | | 4/2001 |
| JP | 2002-120506 | | 4/2002 |
| JP | 2003-065316 | * | 3/2003 |
| JP | 2003-090350 | | 3/2003 |
| JP | 2004-353724 | | 12/2004 |
| JP | 2005-193757 | | 7/2005 |
| JP | 2006-153149 | | 6/2006 |
| JP | 2007-046703 | | 2/2007 |
| WO | 2005/008085 | | 1/2005 |
| WO | 2007/018001 | | 2/2007 |

OTHER PUBLICATIONS

Chinese Office Action issued Dec. 1, 2010 in corresponding Chinese Patent Application No. 200880007459.7 w/English translation.
International Preliminary Report on Patentability and Written Opinion of the International Searching Authority dated Oct. 8, 2009 for International Application No. PCT/JP2008/054191.
International Search Report dated Jun. 10, 2008 for International Application No. PCT/JP2008/054191.
Supplemental European Search Report issued Mar. 6, 2012 in International (PCT) Application No. PCT/JP2008/054191.

* cited by examiner

BEARING DEVICE FOR DRIVING WHEEL, AND ITS ASSEMBLING METHOD

TECHNICAL FIELD

The present invention relates to a bearing device for a driving wheel which rotatably supports a driving wheel (front wheel of a front-engine front-drive (FF) vehicle, rear wheel of a front-engine rear-drive (FR) vehicle, and all wheels of a four-wheel drive (4WD) vehicle) with respect to a suspension device for an automobile, and relates to an assembling method for the same.

BACKGROUND ART

As a conventional bearing device for a driving wheel, for example, there is proposed a bearing device for a driving wheel capable of facilitating assembly work with a small-sized and lightweight structure, preventing generation of harsh gear-rattling noise for a long period of time, and suppressing generation of a backlash in an axial direction without strictly regulating shape dimension accuracy (see Patent Document 1).

As illustrated in FIG. 19, the bearing device for a driving wheel disclosed in Patent Document 1 includes, as main components, a hub wheel 101, an inner race 102, double-row rolling elements 103, 104, an outer race 105, and a constant velocity universal joint 106.

The hub wheel 101 has an inner raceway surface 107 on an outboard side formed on its outer peripheral surface, and includes a wheel attachment flange 109 for being attached to a wheel (not shown). Hub bolts 110 for fixing a wheel disk are embedded at equal intervals in a circumferential direction of the wheel attachment flange 109. The inner race 102 is fit onto a small-diameter step portion 112 formed on the outer peripheral surface on an inboard side of the hub wheel 101, and an inner raceway surface 108 on the inboard side is formed on the outer peripheral surface of the inner race 102. Note that, a female spline 128 for coupling the constant velocity universal joint 106 and the hub wheel so as to be capable of transmitting torque therebetween is formed on the inner peripheral surface of a shaft hole the hub wheel 101.

The inner race 102 is press-fit with adequate interference for the purpose of, preventing creep. The inner raceway surface 107 on the outboard side formed on the outer peripheral surface of the hub wheel 101 and the inner raceway surface 108 on the inboard side formed on the outer peripheral surface of the inner race 102 constitute double-row raceway surfaces. The inner race 102 is press-fit onto the small-diameter step portion 112 of the hub wheel 101, and the end portion of the small-diameter step portion 112 of the hub wheel 101 is caulked outwardly. Consequently, the inner race 102 is prevented from slipping off by a caulked portion 111 thus obtained, and is integrated with the hub wheel 101 to apply preload to a bearing section 120.

The outer race 105 has double-row outer raceway surfaces 113, 114 formed on its inner peripheral surface and opposed to the inner raceway surfaces 107, 108 of the hub wheel 101 and the inner race 102, and includes a vehicle body attachment flange 117 for being attached to a vehicle body (not shown). The vehicle body attachment flange 117 is fitted to a knuckle extending from a suspension device (not shown) of a vehicle body, and is fixed by a bolt or the like.

The bearing section 120 has a double-row angular ball bearing structure, and has a structure in which the rolling elements 103, 104 are interposed between the inner raceway surfaces 107, 108 formed on the outer peripheral surfaces of the hub wheel 101 and the inner race 102 and the outer raceway surfaces 113, 114 formed on the inner peripheral surface of the outer race 105, and the rolling elements 103, 104 in respective rows are supported at equal intervals in the circumferential direction by a cage (not shown). Note that, a predetermined bearing gap is set inside the bearing section 120.

A pair of seals 123, 129 for sealing an annular space between the outer race 105 and the hub wheel 101 and an annular space between the outer race 105 and the inner race 102 so as to be held in slide-contact with the outer peripheral surfaces of the hub wheel 101 and the inner race 102 is fitted to the inner surface at both end portions of the outer race 105 at the openings on both ends of the bearing section 120. Further, the seals 123, 124 prevent leakage of grease filled inside and intrusion of water and foreign matters from an outside.

The constant velocity universal joint 106 is provided at one end of an intermediate shaft (not shown) constituting a drive shaft, and includes an outer joint member 115 having a track groove formed in its inner peripheral surface, an inner joint member 131 having a track groove which is formed in its outer peripheral surface and opposed to the track groove of the outer joint member 115, balls 132 incorporated between the track groove of the outer joint member 115 and the track groove of the inner joint member 131, and a cage 133 interposed between the inner peripheral surface of the outer joint member 115 and the outer peripheral surface of the inner joint member 131 for holding the balls 132. The outer joint member 115 includes a mouth section 125 accommodating the inner joint member 131, the balls 132, and the cage 133, and a stem section 127 extending integrally from the mouth section 125 in the axial direction and having a male spline 126 formed on its outer peripheral surface.

The stem section 127 of the outer joint member 115 is press-fit into the shaft hole of the hub wheel 101, and the male spline 126 formed on the outer peripheral surface of the stem section 127 and the female spline 128 formed to the shaft hole of the hub wheel 101 are fit to each other, whereby the outer joint member 115 and the hub wheel 101 are coupled to each other so as to be capable of transmitting torque therebetween. Further, the bolt 130 is screwed into the end portion of the stem section 127 of the outer joint member 115 through the intermediation of the cap 129 attached to the end portion of the hub wheel 101, whereby the constant velocity universal joint 106 is fixed to the hub wheel 101.

In the bearing device for a driving wheel disclosed in Patent Document 1, the male spline 126 formed on the outer peripheral surface of the stem section 127 of the outer joint member 115 and the female spline 128 formed on the inner peripheral surface of the shaft hole of the hub wheel 101 are tapered splines. That is, teeth of the male spline 126 are formed to have a circumferential width widening inward in the axial direction, and teeth of the female spline 128 are formed to have a circumferential width widening outward in the axial direction. Further, when the stem section 127 of the outer joint member 115 is press-fit into the shaft hole of the hub wheel 101, the male spline 126 of the stem section 127 and the female spline 128 of the hub wheel 101 are engaged with each other in a wedged manner, whereby both the members are coupled to each other so as to be capable of transmitting torque therebetween.

Patent Document 1: JP 2002-120506 A

SUMMARY OF THE INVENTION

Problems to be Solved by the Invention

Incidentally, in the above-mentioned bearing device for a driving wheel disclosed in Patent Document 1, the male spline 126 of the stem section 127 of the outer joint member 115 and the female spline 128 of the shaft hole of the hub wheel 101 are tapered splines, and the male spline 126 and the female spline 128 are engaged with each other in a wedged manner. Consequently, the stem section 127 of the outer joint member 115 and the hub wheel 101 are coupled to each other.

However, it is premised that the male spline 126 of the stem section 127 of the outer joint member 115 is subjected to finishing process by, for example, rolling, and hence it is difficult to increase a taper angle of the male spline 126. Here, the taper angle of the male spline 126 means an angle formed by a shaft of the stem section 127 and tooth surfaces of the male spline 126. In Patent Document 1 described above, the taper angle of 0.75 to 1.25° is disclosed (see paragraph [0026] of Patent Document 1).

Therefore, as disclosed in Patent Document 1, the taper angle of the male spline 126 has to be set to a small angle such as 0.75 to 1.25°. However, if the taper angle of the male spline 126 is small as described above, due to its variations in dimension accuracy, it is difficult to determine fitting positions in the axial direction of the hub wheel 101 and the outer joint member 115. Consequently, a distance between a flange surface of the hub wheel 101 (outboard-side end surface of wheel attachment flange 109 to which a brake rotor is attached) and a joint center is extremely varied, which is not preferred in terms of characteristics of a vehicle drive system.

Further, when the male spline 126 of the stem section 127 and the female spline 128 of the hub wheel 101 are engaged with each other in a wedged manner, the hub wheel 101 and the inner race 102, which are situated on the outer peripheral side of the stem section 127, expand due to a wedge effect by the tapered splines, and the expansion affects a bearing gap of the bearing section 120. Thus, by fastening the bolt 130 to the end portion of the stem section 127, it is difficult to impart a large axial force in the axial direction.

In contract, when the taper angle of the male spline 126 is increased, a separating force in the axial direction increases, which is generated in spline fitting surfaces at the time of transmitting torque. Thus, the increase in the separating force affects reliability and strength of the fastened portion by the bolt 130, and causes generation of unusual noise from the spline fitting surfaces.

The present invention has been made in view of the above-mentioned problems, and an object of the present invention is therefore to provide a small-sized, lightweight, low-cost, and highly reliable bearing device for a driving wheel which needs no tapered spline, and eliminates a circumferential backlash in spline fitting portions to thereby prevent harsh gear-rattling noise and stick-slip noise for a long period of time, and to provide an assembling method for the same.

Means for Solving the Problems

As a technical means for achieving the above-mentioned object, the present invention provides a bearing device for a driving wheel, comprising:

an outer member having an inner periphery in which double-row outer raceway surfaces are formed;

an inner member comprising a hub wheel and an inner race, and having an outer periphery in which double-row inner raceway surfaces opposed to the outer raceway surfaces are formed;

double-row rolling elements interposed between the outer raceway surfaces of the outer member and the inner raceway surfaces of the inner member; and an outer joint member of a constant velocity universal joint having a stem section which is fit and coupled to an inner surface of the hub wheel, wherein the hub wheel and the outer joint member are separably coupled to each other by a plurality of projections which are formed on one of fitting portions between the hub wheel and the stem section and extend in an axial direction, and a plurality of recesses which are formed in another one of the fitting portions and are caused to closely fit on the projections with interference.

After the projections are formed on one of the fitting portions between the hub wheel and the stem section, the recesses, which are caused to closely fit on the projections with interference, can be formed by press-fitting the stem section of the outer joint member into the inner surface of the hub wheel. (The hub wheel may be press-fit to an outer surface of the stem section.) An end of each projection on a side at which press-fitting is started is formed as an edge that is not chamfered. In this case, while involving plastic deformation and cutting, the projections bite in a prospective recess-forming surface on a mating side and form the recesses in the prospective recess-forming surface. The projections bite in the prospective recess-forming surface on the mating side, whereby the inner surface of the hub wheel is slightly expanded in diameter, and thus allows relative movement in the axial direction of the projections. If the relative movement in the axial direction of the projections stops, the inner surface of the hub wheel decreases in diameter to return to the original diameter. Thus, the projections, which are brought into, intimate contact to the recesses with interference, and hence it is possible to firmly couple and integrate the outer joint member and the hub wheel with each other.

Further, in the present invention, the outer joint member and the hub wheel can be separated from each other, and hence repair work for the constant velocity universal joint or the hub wheel can be easily performed. That is, it is possible to reuse the outer joint member and replace the hub wheel with a new one. Alternatively, it is possible to reuse the hub wheel and replace the outer joint member with a new one.

The projections can be caused to closely fit in the recesses while not being allowed to pass through a member having the recesses.

As described above, in order not to allow the projections to pass through the member having the recesses, it is necessary to stop a press-fitting operation of the stem section into the inner surface of the hub wheel before the projections come through the member having the recesses. In this case, of the member having the recesses, in a region on a leading side (press-fitting direction side) with respect to the forward ends of the projections, there is not formed the recess-projection fitting structure in which the projections and the recesses closely fit to each other. The region, in which the recess-projection fitting structure is not formed, constitutes a bank-like region, and exerts a locking effect with respect to the movement in the press-fitting direction of the projections, and hence the hub wheel and the stem section are firmly fixed to each other.

Meanwhile, the projections can be caused to closely fit in the recesses while being allowed to pass through the member having the recesses. In this case, large fitting lengths can be secured between the recesses and the projections, and hence it is possible to increase pulling resistance deriving from torque transmitting performance and the recess-projection fitting structure, and to improve fatigue strength of the recess-projection fitting structure.

In the above-mentioned recess-projection fitting structure, it is desirable that the hub wheel and the outer joint member be brought into contact with each other in the axial direction.

The hub wheel and the outer joint member are caused to abut against with each other in the axial direction (the same direction as the press-fitting direction, in particular). As a result, when the stem section of the outer joint member is press-fit into the inner surface of the hub wheel, it is possible to determine axial positions of the hub wheel and the outer joint member in the recess-projection fitting. This axial contact between the hub wheel and the outer joint member can be realized by directly bring the inner surface of the hub wheel and the outer surface of the outer joint member into butt-contact with each other in the axial direction.

Note that, when the projections are formed on the stem section of the outer joint member, it is desirable that the stem section of the outer joint member be press-fit into the inner surface of the hub wheel having a simple and cylindrical inner peripheral surface with no recess.

It is desirable that surface hardness of the projections be set to be larger than surface hardness of the recesses. With this configuration, the projections tend to easily bite in the prospective recess-forming surface on the mating side, and press-fitting work of the stem section into the inner surface of the hub wheel can be easily performed.

Note that, the projections can be subjected to a thermal hardening treatment by induction hardening. As this hardening treatment, the induction hardening in which a quenching range and a quenching depth are easily controlled is suitable.

It is desirable that the stem section of the outer joint member be prevented from slipping off from the hub wheel by a locking member. Pulling resistance in the axial direction of the stem section of the outer joint member is sufficient owing to strength of the recess-projection fitting structure. However, in order to exert a fail-safe function, it is preferred to add a slip-off preventing structure to the recess-projection fitting structure. The locking member can be locked to, for example, the end portion of the inner surface of the hub wheel.

A gap can be provided between a joint-side end portion of the hub wheel and a hub wheel-opposed end portion of the outer joint member. By provision of such a gap, the joint-side end portion of the hub wheel and the hub wheel-opposed end portion of the outer joint member are out of contact with each other. Thus, it is possible to suppress generation of stick-slip noise between the joint-side end portion of the hub wheel and the hub wheel-opposed end portion of the outer joint member.

Here, "stick-slip noise" means noise which is caused by sudden slip generated between the joint-side end portion of the hub wheel and the hub wheel-opposed end portion of the outer joint member due to torsion of the outer joint member when rotational torque is applied from the stem section of the outer joint member to the stationary hub wheel at the time of start of a vehicle.

It is desirable that an outer peripheral surface of the outer member be fit to a knuckle, and that a minimum inner diameter dimension of a surface, which fits to the outer member, of the knuckle be set to be larger than a maximum outer diameter dimension of the constant velocity universal joint. Here, the constant velocity universal joint means one having a structure including a boot and a boot band. As described above, when the minimum inner diameter dimension of the surface, which fits to the outer member, of the knuckle is set to be larger than the maximum outer diameter dimension of the constant velocity universal joint, the bearing device for a driving wheel including the outer member, the inner member, the rolling elements, and the constant velocity universal joint can be inserted through the knuckle as a unit, and hence it is possible to easily assemble and disassemble the bearing device for a driving wheel.

In the above-mentioned recess-projection fitting structure, the outer joint member and the hub wheel can be separated from each other, and hence repair work for the constant velocity universal joint or the hub wheel can be easily performed. The repair work can be realized by the following assembling method.

As a first assembling method, it is possible to carry out an assembling method for a bearing device of a driving wheel, including:

pulling, when an assembly body and an outer joint member of a constant velocity universal joint which is fitted to an inner surface of a hub wheel are separably coupled to each other by a recess-projection fitting structure, and when the outer joint member is reused and the assembly body is replaced, a stem section of the reused outer joint member from the inner surface of the hub wheel of the assembly body; and assembling the stem section of the reused outer joint member into an inner surface of a hub wheel of a fresh assembly body, thereby reconfiguring the recess-projection fitting structure, the assembly body including:

an outer member having an inner periphery in which double-row outer raceway surfaces are formed;

an inner member including the hub wheel and an inner race, and having an outer periphery in which double-row inner raceway surfaces opposed to the outer raceway surfaces are formed; and double-row rolling elements interposed between the outer raceway surfaces of the outer member and the inner raceway surfaces of the inner member, the recess-projection fitting structure including:

a plurality of projections which are formed on one of fitting portions between the hub wheel and the stem section of the outer joint member and extend in an axial direction; and a plurality of recesses which are formed in another one of the fitting portions and are caused to closely fit on the projections with interference. The fresh assembly body and the reused outer joint member are coupled to each other in a preload state.

In this case, when the stem section of the reused outer joint member has the projections, under a state in which the recesses having the interference with respect to the projections are formed in the hub wheel of the fresh assembly body, the stem section is assembled to the inner surface of the new hub wheel.

Further, when the stem section of the reused outer joint member has the recesses, under a state in which the projections having the interference with respect to the recesses are formed on the hub wheel of the fresh assembly body, the stem section is assembled to the inner surface of the new hub wheel.

Further, as a second assembling method, it is possible to carry out an assembling method for a bearing device of a driving wheel, including:

pulling, when an assembly body and an outer joint member of a constant velocity universal joint which is fitted to an inner surface of a hub wheel are separably coupled to each other by a recess-projection fitting structure, and when the assembly body is reused and the outer joint member is replaced, a stem section of the outer joint member from the inner surface of the hub wheel of the reused assembly body; and assembling a stem section of a new outer joint member into the inner surface of the hub wheel of the reused assembly body, thereby reconfiguring the recess-projection fitting structure, the assembly body including:

an outer member having an inner periphery in which double-row outer raceway surfaces are formed;

an inner member including the hub wheel and an inner race, having an outer periphery in which double-row inner raceway surfaces opposed to the outer raceway surfaces are formed; and double-row rolling elements interposed between the outer raceway surfaces of the outer member and the inner raceway surfaces of the inner member, and the recess-projection fitting structure including:

a plurality of projections which are formed on one of fitting portions between the hub wheel and the stem section of the outer joint member and extend in an axial direction; and a plurality of recesses which are formed in another one of the fitting portions and are caused to closely fit on the projections with interference. The reused assembly body and the new outer joint member are coupled to each other in a preload state.

When the hub wheel of the reused assembly body has the projections, under a state in which the recesses having the interference with respect to the projections are formed in the stem section of the new outer joint member, the stem section of the new outer joint member is assembled to the inner surface of the hub wheel.

Further, when the hub wheel of the reused assembly body has the recesses, under a state in which the projections having the interference with respect to the recesses are formed on the stem section of the new outer joint member, the stem section of the new outer joint member is assembled to the inner surface of the hub wheel.

The above-mentioned assembling method can be carried out by drawing the outer joint member into a direction of coming closer to the hub wheel by a jig in which its movement in a direction of coming closer to the constant velocity universal joint is regulated by the hub wheel, thereby press-fitting the stem section of the outer joint member into the inner surface of the hub wheel. With use of such a separate and dedicated jig, the stem section can be easily repress-fit into the hub wheel.

Effects of the Invention

According to the present invention, the plurality of projections which are formed on one of the fitting portions between the hub wheel and the stem section and extend in the axial direction, and the plurality of recesses which are formed in another one of the fitting portions are closely fit to each other with interference, and hence it is possible to firmly couple and integrate the outer joint member and the hub wheel with each other. Further, in this recess-projection fitting structure, the outer joint member and the hub wheel can be separated from each other, and hence repair work for the outer joint member or the hub wheel can be easily performed.

As a result, there can be provided a small-sized, light-weight, low-cost, and highly reliable bearing device for a driving wheel, which needs no conventional tapered spline, and eliminates a circumferential backlash in spline fitting portions to thereby prevent harsh gear-rattling noise and stick-slip noise for a long period of time.

DETAILED DESCRIPTION OF THE INVENTION

Figure 1:
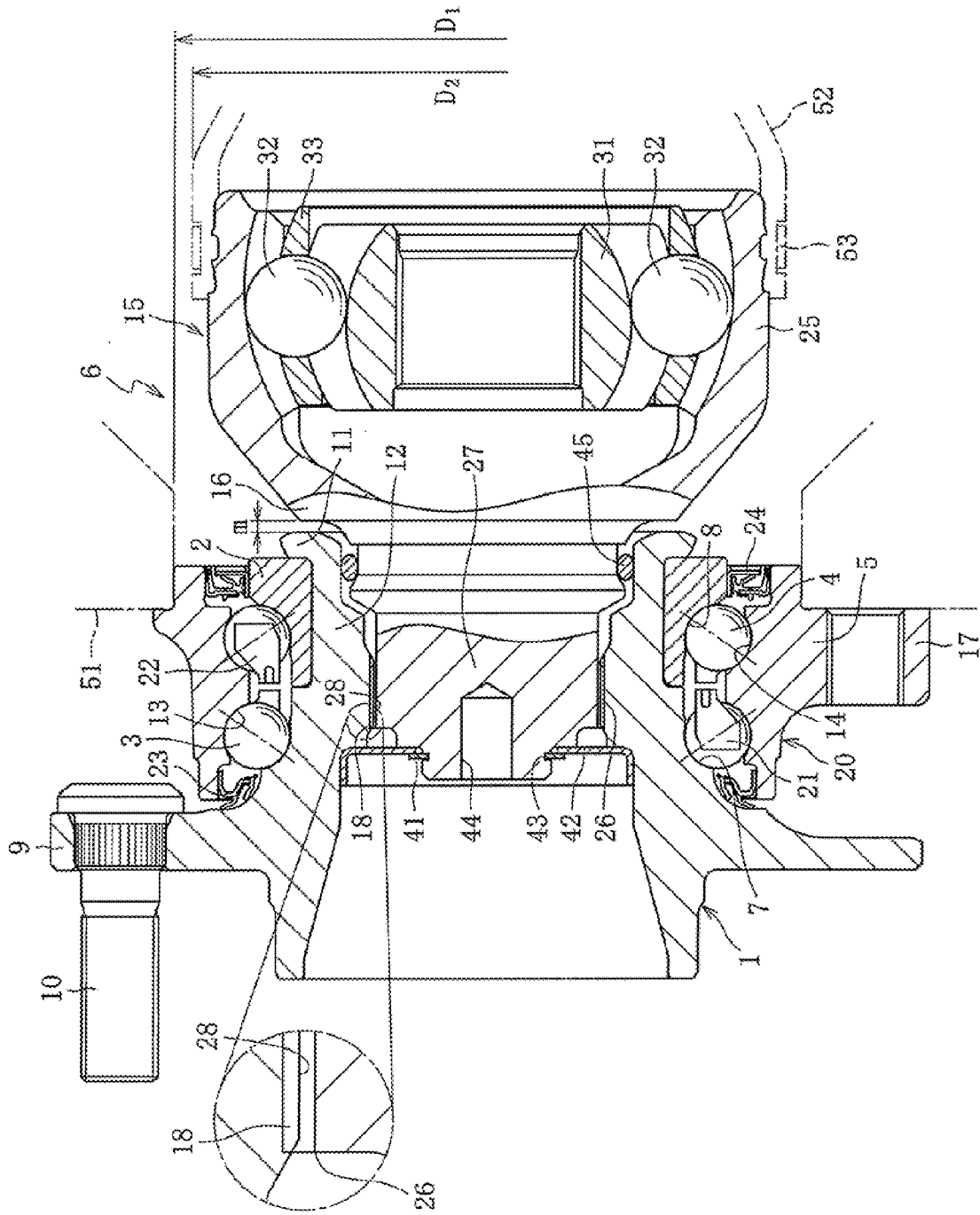
FIG. 1 is a longitudinal sectional view of an entire structure of a bearing device for a driving wheel according to a first embodiment of the present invention.

In the following, embodiments of a bearing device for a driving wheel according to the present invention are described in detail. A bearing device for a driving wheel according to each of the embodiments illustrated in FIGS. 1 to 5 includes, as main components, a hub wheel 1 and an inner race 2 which serve as inner members, double-row rolling elements 3, 4, an outer race 5, and a constant velocity universal joint 6. Note that, in the following description, an outer side of a vehicle in a state in which the bearing device is assembled to the vehicle is referred to as an outboard side (left in the figures), and a middle side of the vehicle is referred to as an inboard side (right in the figures).

The hub wheel 1 has an inner raceway surface 7 on an outboard side formed on its outer peripheral surface, and includes a wheel attachment flange 9 for being attached to a wheel (not shown). Hub bolts 10 for fixing a wheel disk are embedded at equal intervals in a circumferential direction of the wheel attachment flange 9. The inner race 2 is fit onto a small-diameter step portion 12 formed on the outer peripheral surface on an inboard side of the hub wheel 1, and an inner raceway surface 8 on the inboard side is formed on the outer peripheral surface of the inner race 2. The hub wheel 1 is manufactured by turning or forging.

The inner race 2 is press-fitted with adequate interference for the purpose of preventing creep. The inner raceway surface 7 on the outboard side formed on the outer peripheral surface of the hub wheel 1 and the inner raceway surface 8 on the inboard side formed on the outer peripheral surface of the inner race 2 constitute double-row raceway surfaces. The inner race 2 is press-fitted onto the small-diameter step portion 12 of the hub wheel 1, and the end portion of the small-diameter step portion 12 of the hub wheel 1 is caulked outwardly by orbital forming. Consequently, the inner race 2 is prevented from slipping off by a caulked portion 11 thus obtained, and is integrated with the hub wheel 1 to apply preload to a bearing section 20.

The outer race 5 has double-row outer raceway surfaces 13, 14 formed on its inner peripheral surface and opposed to the inner raceway surfaces 7, 8 of the hub wheel 1 and the inner race 2, and includes a vehicle body attachment flange 17 for being attached to a vehicle body (not shown). The vehicle body attachment flange 17 is fitted to a knuckle 51 extending from a suspension device (not shown) of a vehicle body, and is fixed by a bolt or the like.

The bearing section 20 has a double-row angular ball bearing structure, and has a structure in which the rolling elements 3, 4 are interposed between the inner raceway surfaces 7, 8 formed on the outer peripheral surfaces of the hub wheel 1 and the inner race 2 and the outer raceway surfaces 13, 14 formed on the inner peripheral surface of the outer race 5, and the rolling elements 3, 4 in respective rows are supported at equal intervals in the circumferential direction by a cage 21, 22 (not shown). Note that, a predetermined bearing gap is set, inside the bearing section 20.

A pair of seals 23, 24 for sealing an annular space between the outer race 5 and the hub wheel 1 and an annular space between the outer race 5 and the inner race 2 so as to be held in slide-contact with the outer peripheral surfaces of the hub wheel 1 and the inner race 2 is fitted to the inner surface at both end portions of the outer race 5 at the openings on both ends of the bearing section 20. Further, the seals 23, 24 prevent leakage of grease filled inside and intrusion of water and foreign matters from an outside.

The constant velocity universal joint 6 is provided at one end of an intermediate shaft (not shown) constituting a drive shaft, and includes an outer joint member 15 having a track groove formed in its inner peripheral surface, an inner joint member 31 having a track groove which is formed in its outer peripheral surface and opposed to the track groove of the outer joint member 15, balls 32 incorporated between the track groove of the outer joint member 15 and the track groove of the inner joint member 31, and a cage 33 interposed between the inner peripheral surface of the outer joint member 15 and the outer peripheral surface of the inner joint member 31 for holding the balls 32. The outer joint member 15 includes a mouth section 25 accommodating the inner joint member 31, the balls 32, and the cage 33, and a stem section 27 extending integrally from the mouth section 25 in the axial direction and having a male spline 26 formed on its outer peripheral surface. This outer joint member 15 is manufactured by forging, for example, and the stem section 27 is fitted to the inner surface of the hub wheel 1.

Figure 6A:
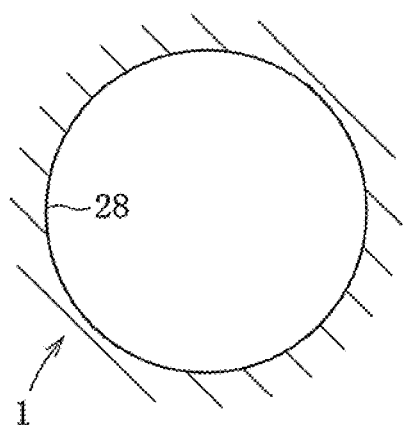
FIG. 6a is a lateral sectional view of a shaft hole of a hub wheel of each of FIGS. 1 to 5.
Figure 6B:
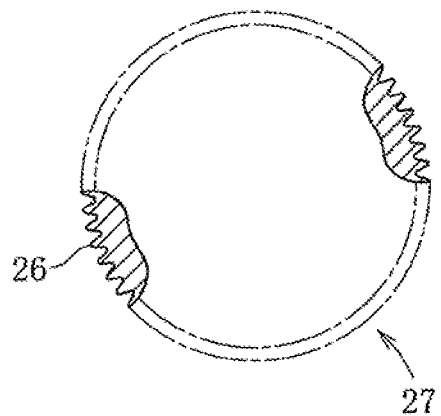
FIG. 6b is a lateral sectional view of a stem section of an outer joint member of each of FIGS. 1 to 5.

As illustrated in FIG. 6a, in assembly of this bearing device for a driving wheel, a shaft hole 28 of the hub wheel 1, which is a fitting portion with the stem section 27, is formed into a simple cylindrical shape having no female spline. Further, as illustrated in FIG. 6b, in the outer peripheral surface of the stem section 27 of the outer joint member 15 which is a fitting portion with the hub wheel 1, there is formed the male spline 26 having a plurality of axially extending projections (regions projecting to an outer surface side with respect to tooth bottoms). The stem section 27 is press-fit into the shaft hole 28 of the hub wheel 1, whereby recess-projection surfaces of a shape corresponding to the male spline 26 (shape approximate to the female spline) are formed to the shaft hole 28 of the hub wheel 1. In this case, projections of the male spline 26 formed on the stem section 27 and recesses (spaces formed to the outer surface side with respect to tooth tips) of the recess-projection surfaces formed in the hub wheel 1 closely fit to each other with interference. A recess-projection fitting structure is configured by the projections and the recesses adhering and fitting to each other as described above.

In this recess-projection fitting structure, a shape of the male spline 26 is transferred to the shaft hole 28 of the hub wheel 1 while involving plastic deformation and cutting, such that the recesses have portions cut by the projections of the male spline 26. In this case, the male spline 26 bites in the shaft hole 28 of the hub wheel 1, whereby the inner surface of the hub wheel 1 is slightly expanded in diameter and allows movement in the axial direction of the male spline 26. If the movement in the axial direction stops, the inner surface of the hub wheel 1 decreases in diameter to return to the original diameter.

Thus, the entire male spline 26 firmly closely fits to the recess-projection surfaces formed to the shaft hole 28 of the hub wheel 1, and hence the outer joint member 15 and the hub wheel 1 can be firmly coupled and integrated with each other. Owing to low-cost and highly reliable coupling as described above, it is possible to eliminate a backlash in the circumferential direction of fitting portions between the stem section 27 and the hub wheel 1, and to prevent harsh gear-rattling noise for a long period of time.

Figure 2:
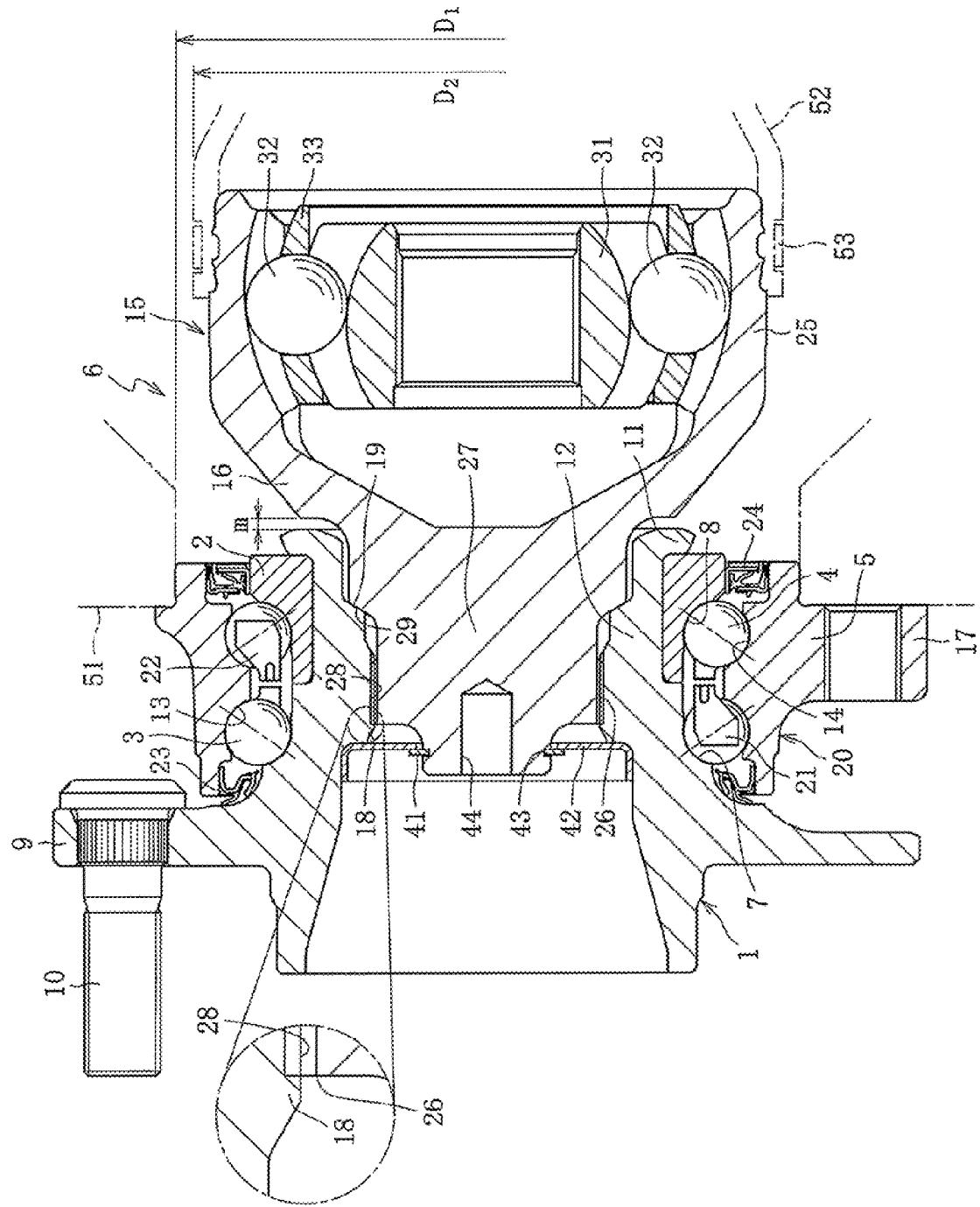
FIG. 2 is a longitudinal sectional view of an entire structure of a bearing device for a driving wheel according to a second embodiment of the present invention.
Figure 3:
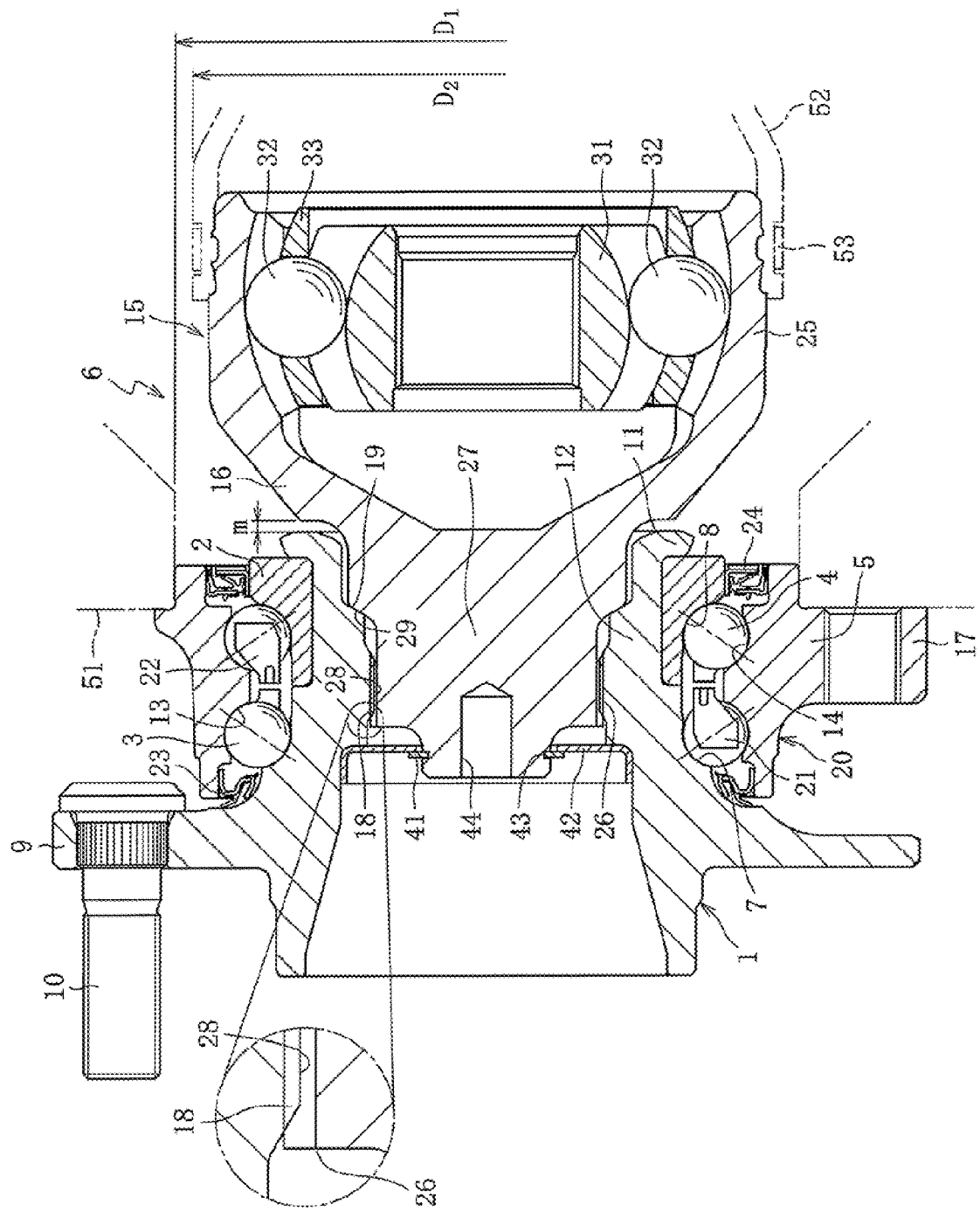
FIG. 3 is a longitudinal sectional view of an entire structure of a bearing device for a driving wheel according to a third embodiment of the present invention.
Figure 4:
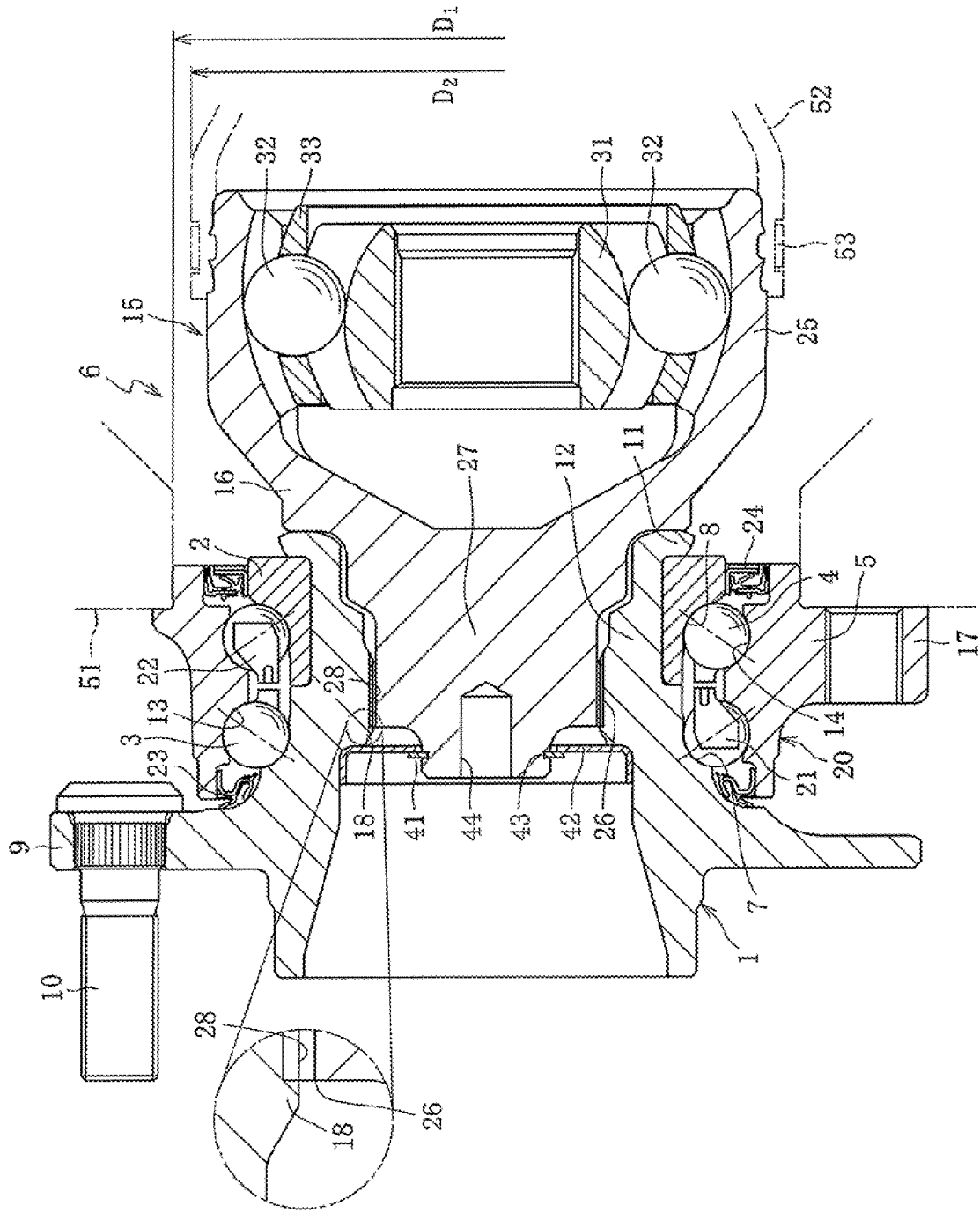
FIG. 4 is a longitudinal sectional view of an entire structure of a bearing device for a driving wheel according to a fourth embodiment of the present invention.
Figure 5:
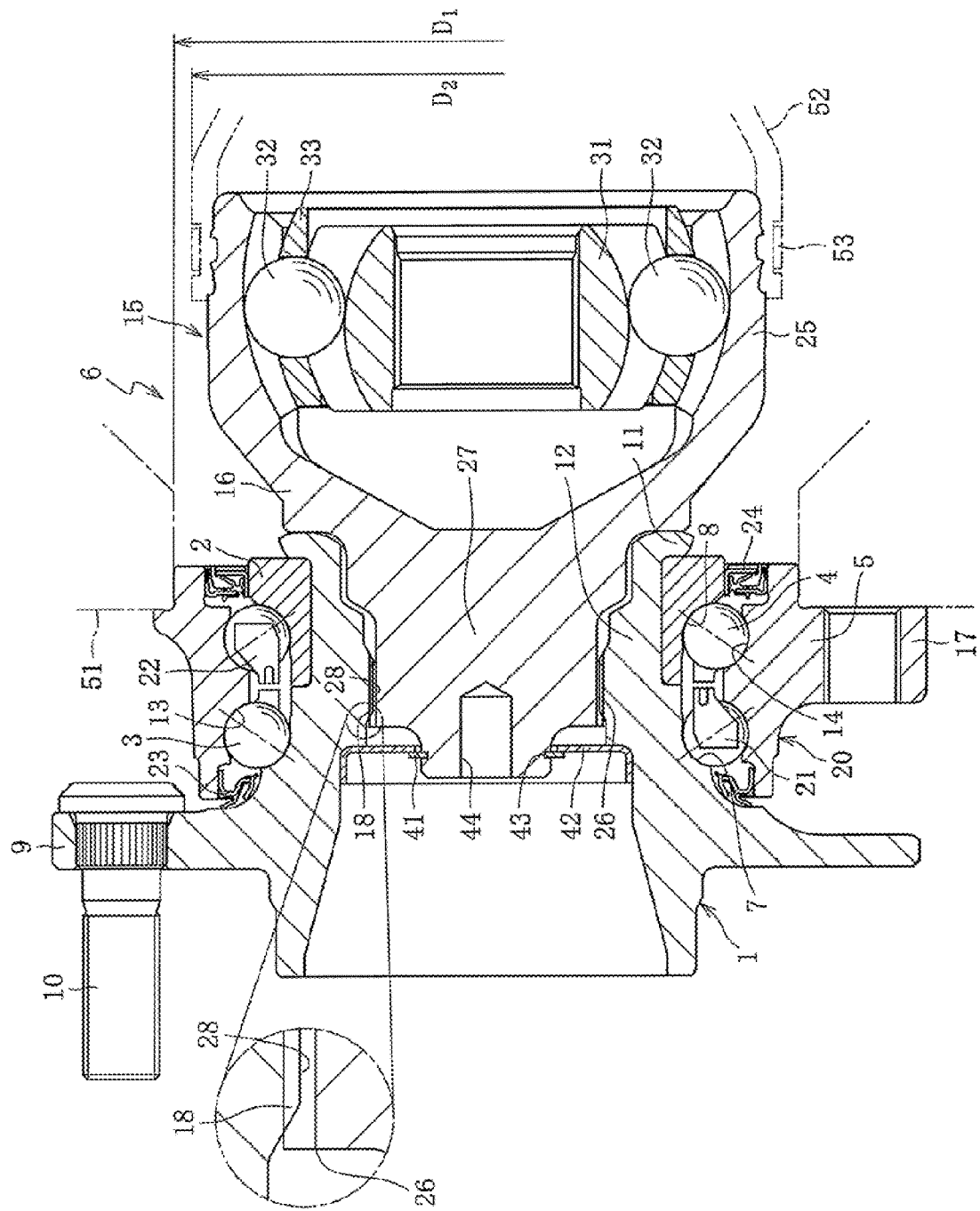
FIG. 5 is a longitudinal sectional view of an entire structure of a bearing device for a driving wheel according to a fifth embodiment of the present invention.

In a second embodiment illustrated in FIG. 2 and a fourth embodiment illustrated in FIG. 4, the recess-projection fitting structure is formed in a region of the shaft hole 28 of the hub wheel 1 excluding an outboard-side end portion 18. Further, in a first embodiment illustrated in FIG. 1, a third embodiment illustrated in FIG. 3, and a fifth embodiment illustrated in FIG. 5, the recess-projection fitting structure is formed over the entire axial length of the shaft hole 28 of the hub wheel 1 including the outboard-side end portion 18.

In the second embodiment and the fourth embodiment, in order not to allow the projections of the male spline 26 to pass through the shaft hole 28 of the hub wheel 1, a press-fitting operation for the stem section 27 is stopped before the forward end of the male spline 26 reaches the outboard-side end portion 18 of the shaft hole 28 of the hub wheel 1. Thus, the recess-projection fitting structure it not formed at the outboard-side end portion 18 of the shaft hole 28 of the hub wheel 1. As described above, in a configuration in which the recess-projection fitting structure is not formed at the outboard-side end portion 18 of the shaft hole 28 of the hub wheel 1, a bank-like region formed at the outboard-side end portion 18 of the hub wheel 1 reinforces a locking effect in an inserting direction of the stem section 27 with respect to the projections of the male spline 26, and hence the hub wheel 1 and the stem section 27 of the outer joint member 15 are more firmly fixed to each other.

Meanwhile, in the first embodiment, the third embodiment, and the fifth embodiment, in order to allow the male spline 26 to pass through the shaft hole 28 of the hub wheel 1, the male spline 26 is press-fit over the entire axial length of the shaft hole 28 of the hub wheel 1 including the outboard-side end portion 18. Thus, the recess-projection fitting structure is formed over the entire axial length of the shaft hole 28 of the hub wheel 1 including the outboard-side end portion 18. As described above, when the recess-projection fitting structure is formed over the entire axial length of the shaft hole 28 of the hub wheel 1, larger fitting length can be secured, and hence it is possible to increase pulling resistance deriving from torque transmitting performance and the recess-projection fitting structure, and to improve fatigue strength of the recess-projection fitting structure.

In each of the above-mentioned embodiments, the female spline is not formed to the shaft hole 28 of the hub wheel 1 serving as the fitting portion with the stem section 27, and the male spline 26 is formed on the outer peripheral surface of the stem section 27 serving as the fitting portion with the hub wheel 1. However, the female spline may be formed to the shaft hole 28 of the hub wheel 1, and the outer peripheral surface of the stem section 27 may be formed into a simple cylindrical surface without forming the male spline thereon. In this case, in accordance with press-fitting of the stem section 27 into the inner surface of the hub wheel 1, the projections (regions projecting to the inner surface side with respect to tooth bottoms) of the female spline bite in the outer peripheral surface of the stem section 27 to form the recesses (spaces formed to the outer surface side with respect to tooth tips), whereby the recess-projection surfaces of a shape approximate to the male spline are formed on the outer peripheral surface of the stem section 27. Also in this case, the recess-projection fitting structure is formed by adhesion and fitting with interference between the projections of the female spline and the recesses of the stem section 27, and hence it is possible to separably couple the hub wheel 1 and the outer joint member 15 with sufficient strength.

In the case where the female spline is not formed to the shaft hole 28 of the hub wheel 1 and the male spline 26 is formed on the outer peripheral surface of the stem section 27, the inner peripheral surface of the shaft hole 28 of the hub wheel 1 is left in an unhardened state, that is, a raw material. In addition, the male spline 26 of the stem section 27 of the outer joint member 15 is subjected to hardening treatment by induction hardening. Thus, the male spline 26 tends to easily bite in the shaft hole 28 of the hub wheel 1, and hence press-fitting work of the stem section 27 into the inner surface of the hub wheel 1 can be easily performed. As the hardening treatment for the male spline 26, the induction hardening in which a quenching range and a quenching depth are easily controlled is suitable, but other hardening treatment may be adopted. Note that, the hub wheel 1 is basically made of a raw material not subjected to heat treatment. However, the heat treatment may be performed on the hub wheel 1 as long as surface hardness of the hub wheel 1 does not exceed that of the male spline 26 of the stem section 27. It suffices that at least surface hardness of the projections formed on the outer peripheral surface of the stem section 27 is larger than surface hardness of the recesses formed to the shaft hole 28 of the hub wheel 1.

Similarly, in the case where the female spline is formed to the shaft hole 28 of the hub wheel 1 and the outer peripheral surface of the stem section 27 is formed into a simple cylindrical surface, surface hardness of the female spline (projections, in particular) is set to be larger than surface hardness of the outer peripheral surface of the stem section 27. In this case, a method for hardening treatment, a magnitude relation in surface height, or a state of whether or not the hardening treatment is performed on the outer peripheral surface of the stem section 27 conforms to the above-mentioned case.

The stem section 27 of the outer joint member 15 is prevented from slipping off from the hub wheel 1 by a snap ring 41 serving as a locking member. In this slip-off preventing structure, a cap 42 is fit into and locked to a large-diameter step portion of the shaft hole of the hub wheel 1, and the snap ring 41 is fit in and brought into intimate contact with an annular groove 43 formed at the small-diameter end portion of the stem section 27, whereby the snap ring 41 is locked to the inner peripheral edge portion of the cap 42. Pulling resistance in the axial direction of the stem section 27 of the outer joint member 15 is sufficient owing to the strength of the recess-projection fitting structure. However, in order to exert a fail-safe function, it is preferred to add the above-mentioned slip-off preventing structure to the recess-projection fitting structure. Note that, as described below, in the small-diameter end surface of the stem section 27, there is provided a pin hole 44 for guiding the stem section 27 in press-fitting into the shaft hole 28 of the hub wheel 1.

In the first to third embodiments, a gap m is provided between a caulked section 11 as an end portion on the joint side of the hub wheel 1, and a shoulder section 16 as an end portion, which is opposed to the hub wheel, of the outer joint member 15. Provision of the gap m between the caulked section 11 of the hub wheel 1 and the shoulder section 16 of the outer joint member 15 as described above brings the caulked section 11 of the hub wheel 1 and the shoulder section 16 of the outer joint member 15 out of contact with each other. Thus, the caulked section 11 of the hub wheel 1 and the shoulder section 16 of the outer joint member 15 are out of contact with each other, and hence it is possible to suppress generation of stick-slip noise between the caulked section 11 of the hub wheel 1 and the shoulder section 16 of the outer joint member 15.

Note that, in the first embodiment, the gap m is formed between the caulked section 11 of the hub wheel 1 and the shoulder section 16 of the outer joint member 15. Therefore, in order to prevent rust and the like from occurring in fitting portions between the hub wheel 1 and the stem section 27, an O-ring 45 serving as a seal member is interposed between the outer peripheral surface on the base of the stem section 27 of the outer joint member 15 and the inner peripheral surface at the inboard-side end portion of the hub wheel 1.

In the fourth embodiment and the fifth embodiment, the caulked section 11 of the hub wheel 1 and the shoulder section 16 of the outer joint member 15 are in contact with each other. With this configuration, rigidity of the bearing device can be increased, and the O-ring becomes unnecessary. If the recess-projection fitting structure is formed while controlling contact surface pressure between the caulked section 11 of the hub wheel 1 and the shoulder section 16 of the outer joint member 15, it is possible to suppress generation of the stick-slip noise between the caulked section 11 of the hub wheel 1 and the shoulder section 16 of the outer joint member 15.

In the recess-projection fitting structure of each of the second to fifth embodiments, the hub wheel 1 and the outer joint member 15 are caused to abut against with each other in the axial direction (direction of coming into contact with each other). In the second embodiment and the third embodiment, a taper-shaped step section 19 is formed on the inner surface of the hub wheel 1 and a taper-Shaped step section 29 is formed on the outer surface of the stem section 27 of the outer joint member 15, and the step section 19 on the inner surface of the hub wheel 1 and the step section 29 on the outer surface of the stem section 27 are brought into butt-contact with each other. Further, in the fourth embodiment and the fifth embodiment, the caulked section 11 of the hub wheel 1 and the shoulder section 16 of the outer joint member 15 are brought into butt-contact with each other. Thus, the hub wheel 1 and the outer joint member 15 are caused to abut against with each other in the axial direction, whereby it is possible to determine the axial positions in the recess-projection fitting of the hub wheel 1 and the outer joint member 15 when the stem section 27 is press-fit into the shaft hole 28 of the hub wheel 1.

In the first to fifth embodiments, the outer peripheral surface of the outer race 5 is fitted to a knuckle 51, and a minimum inner diameter dimension $D_1$ of a fitting surface of the knuckle 51 with the outer race 5 is set to be larger than a maximum outer diameter dimension $D_2$ of the constant velocity universal joint 6 (in the state in which a boot 52 and a boot band 53 are mounted to the opening end of the outer joint member 15). As described above, when the minimum inner diameter dimension $D_1$ of the fitting surface of the knuckle 51 with the outer race 5 is set to be larger than the maximum outer diameter dimension $D_2$ of the constant velocity universal joint 6, the bearing device for a driving wheel including the outer race 5, the hub wheel 1, the inner race 2, the rolling elements 3, 4, and the constant velocity universal joint 6 can be inserted through the knuckle 51 as a unit, and hence it is possible to easily assemble and disassemble the bearing device for a driving wheel.

Note that, in the first to fifth embodiments, there is described the case of adopting the snap ring 41 as the slip-off preventing structure of the stem section 27 with respect to the hub wheel 1. However, the present invention is not limited thereto, and slip-off preventing structures according to modifications illustrated in FIGS. 7 and 8 may be adopted. In the slip-off preventing structure illustrated in FIG. 7, a male screw section 46 for preventing slip-off is formed on the outer peripheral surface at the outboard-side end portion of the stem section 27 of the outer joint member 15, and a nut 47, which is screwed onto the male screw section 46, is locked to the outboard-side end portion of the shaft hole 28 of the hub wheel 1. Further, in the slip-off preventing structure illustrated in FIG. 8, the male screw section 46 for preventing slip-off is formed on the outer peripheral surface at the outboard-side end portion of the stem section 27 of the outer joint member 15, the nut 47, which is screwed onto the male screw section 46, is locked to the outboard-side end portion of the shaft hole 28 of the hub wheel 1, and a cap 49 is screwed onto the male screw section 46.

Figure 7:
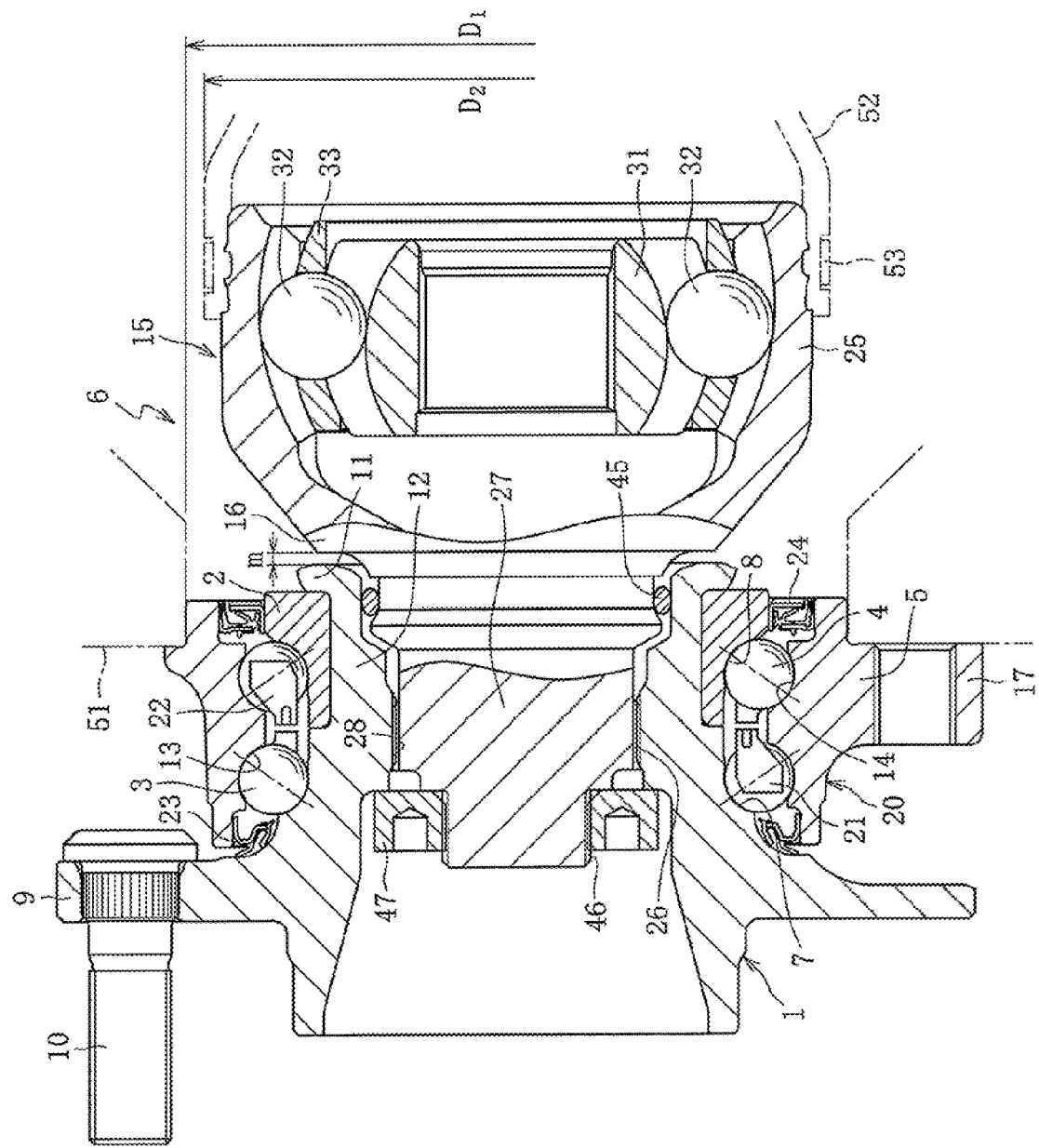
FIG. 7 is a longitudinal sectional view of an entire structure of a bearing device for a driving wheel according to a modification of the first embodiment of the present invention.

Note that, while the modification illustrated in FIG. 7 is applied to the first embodiment, the modification of FIG. 7 can be applied to the second to fifth embodiments. Further, while the modification illustrated in FIG. 8 is applied to the second embodiment, the modification of FIG. 8 can be applied to the first and third to fifth embodiments.

Figure 8:
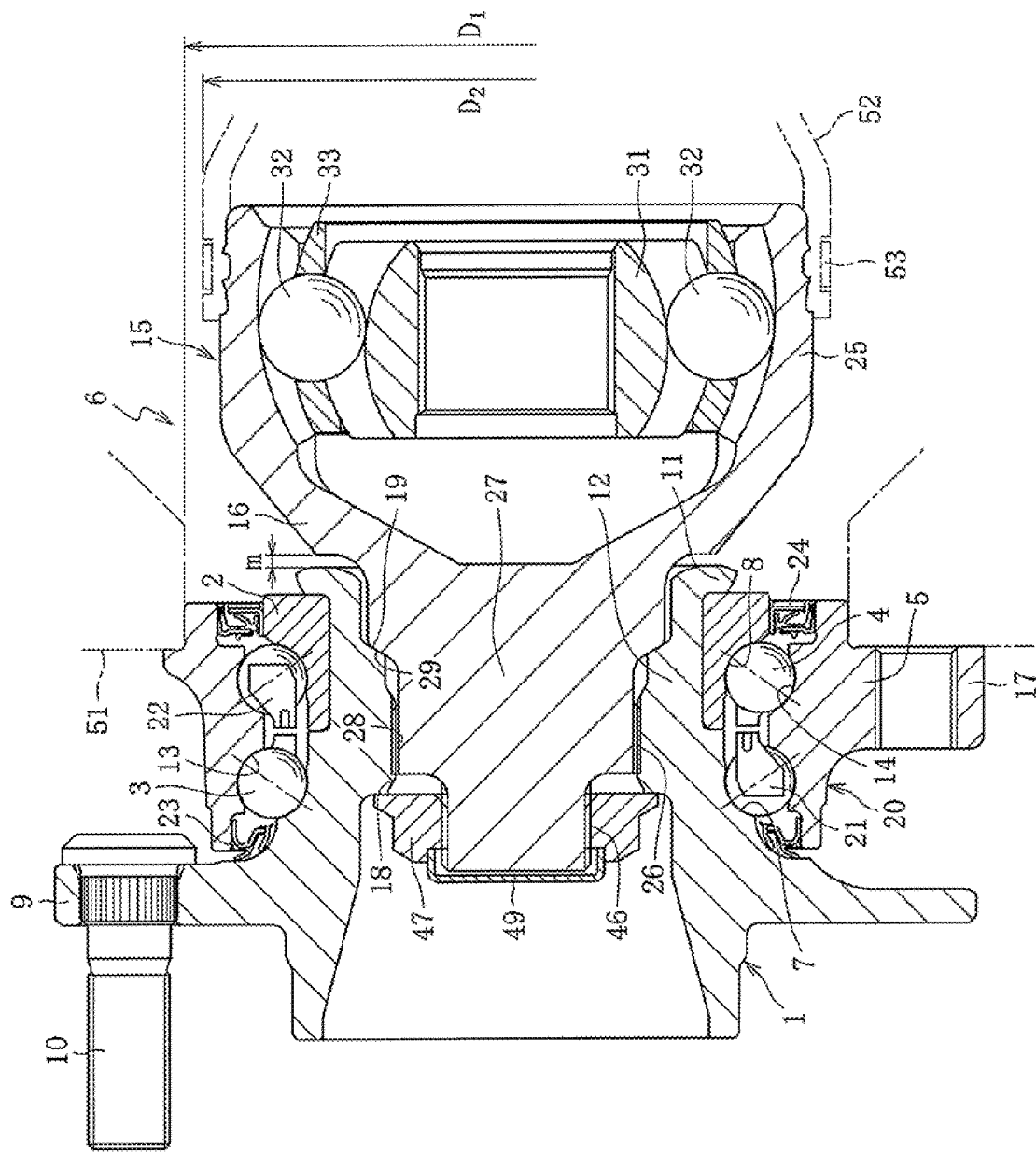
FIG. 8 is a longitudinal sectional view of an entire structure of a bearing device for a driving wheel according to a modification of the second embodiment of the present invention.

In the following description, the bearing device for a driving wheel according to the first or second embodiment is described, and the bearing device for a driving wheel according to each of the third to fifth embodiments and the modifications illustrated in FIGS. 7 and 8 is omitted. However, the operations and effects are the same in any one of the embodiments.

Figure 9:
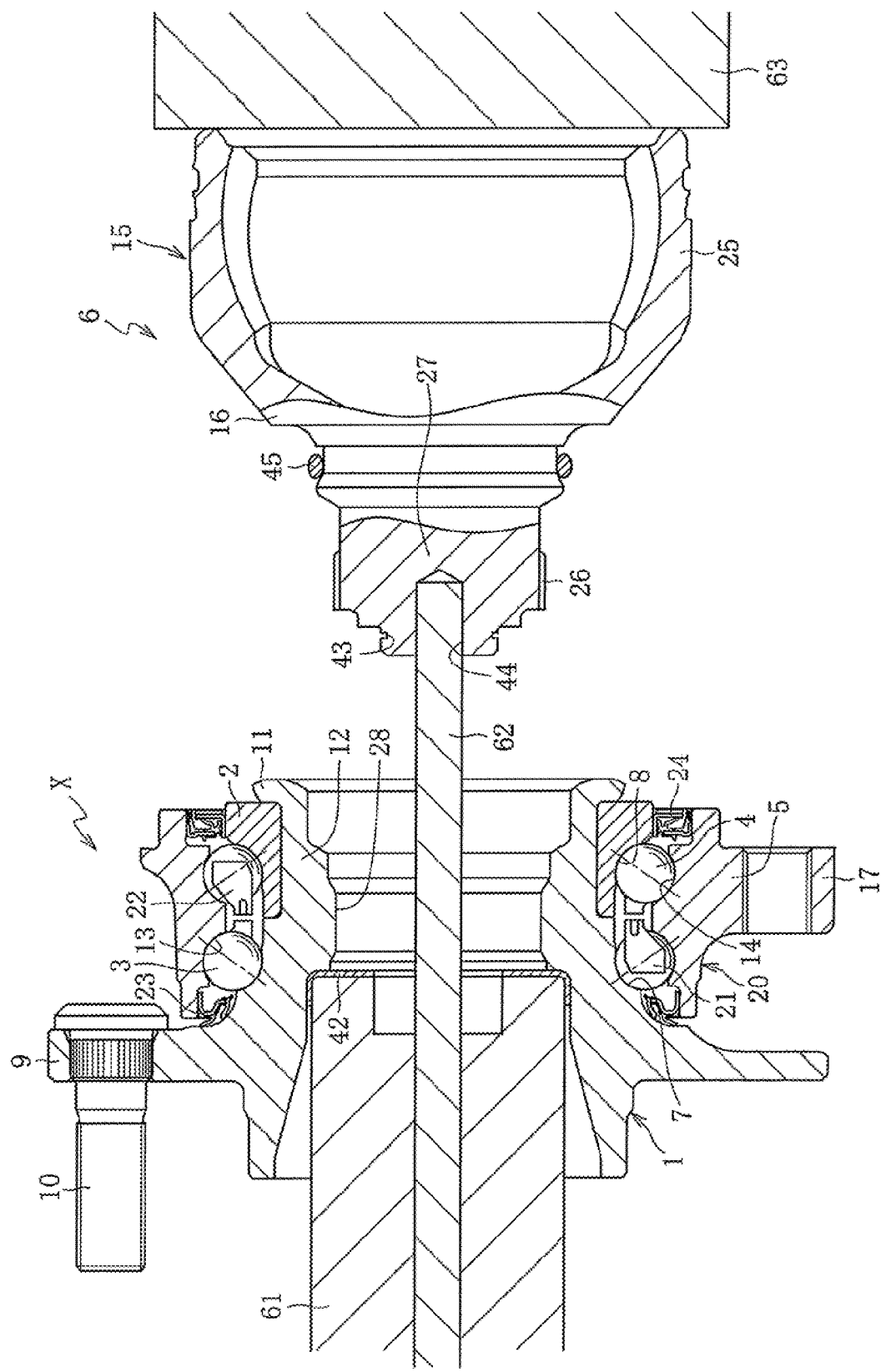
FIG. 9 is a sectional view illustrating a procedure for press-fitting the stem section of the outer joint member into the hub wheel in the bearing device for a driving wheel of FIG. 1.
Figure 10:
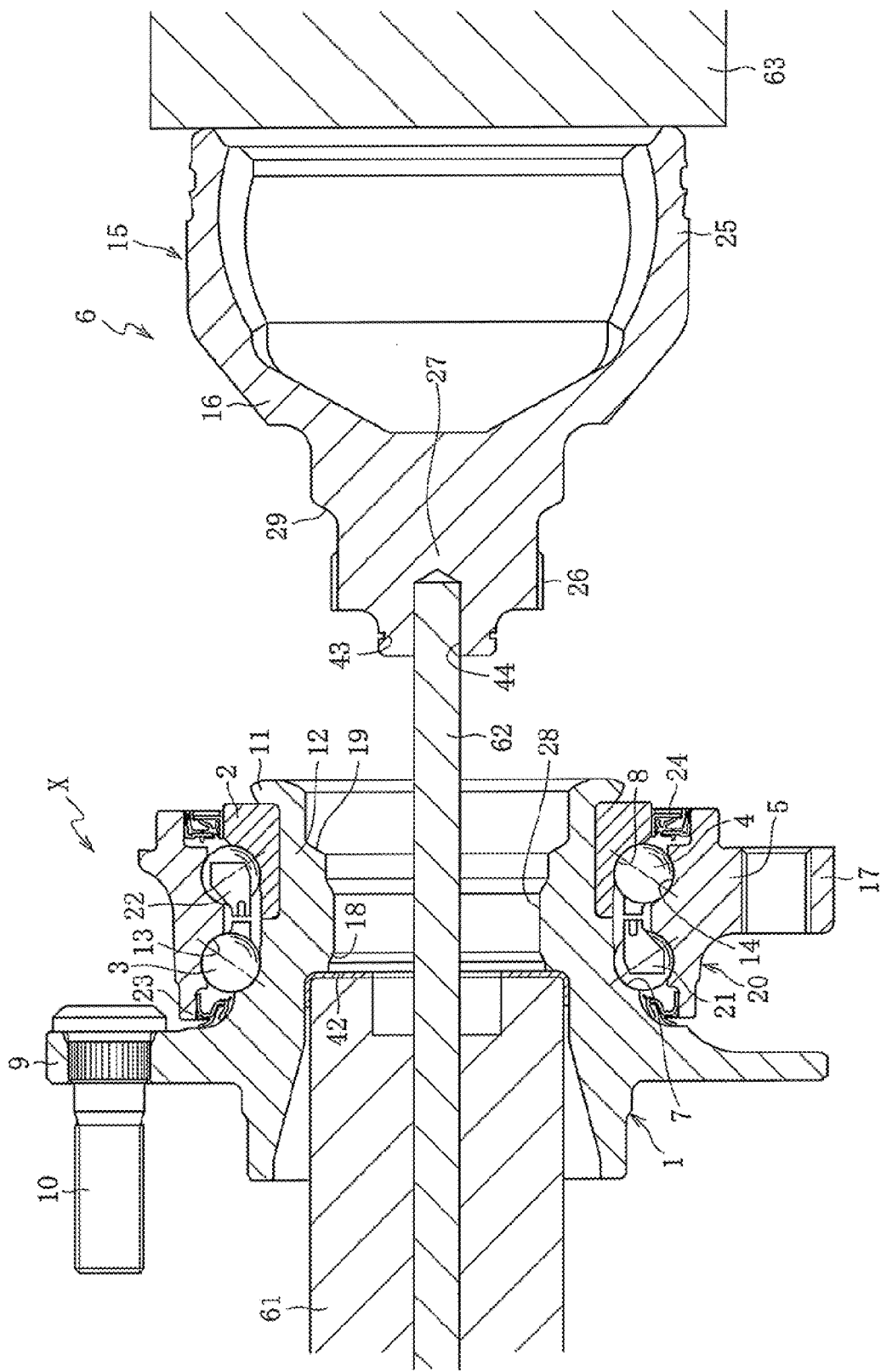
FIG. 10 is a sectional view illustrating a procedure for press-fitting the stem section of the outer joint member into the hub wheel in the bearing device for a driving wheel of FIG. 2.

FIG. 9 illustrates the case according to the first embodiment, and FIG. 10 illustrates the case according to the second embodiment. In the above-mentioned recess-projection fitting structure, when the stem section 27 is press-fit into the shaft hole 28 of the hub wheel 1, as illustrated in FIGS. 9 and 10, a pedestal 61 is brought into contact with the large-diameter step portion of the shaft hole of the hub wheel 1 through the intermediation of the cap 42, and the hub wheel 1 is supported by the pedestal 61. At this time, the hub wheel 1 is an assembly body X to which the inner race 2, the rolling elements 3, 4, and the outer race 5 are assembled. In this state, a forward end of a guide rod 62 for centering, which is inserted into the pedestal 61 so as to slide freely along the axial direction, is fit into the pin hole 44 formed at the small-diameter end portion of the stem section 27 of the outer joint member 15. In this state, a pressing member 63 is brought into contact with the opening end of the mouth section 25 of the outer joint member 15.

Then, the opening end of the mouth section 25 is pressed along the axial direction by this pressing member 63, whereby the stem section 27 of the outer joint member 15 is press-fit into the shaft hole 28 of the hub wheel 1. At this time, the guide rod 62 slides with respect to the pedestal 61 and retreats while the stem section 27 of the outer joint member 15 is supported by the guide rod 62. Note that, in the case of the first embodiment illustrated in FIG. 9, the O-ring 45 is mounted in advance on the outer peripheral surface on the base of the stem section 27 of the outer joint member 15.

In coupling by this recess-projection fitting structure, the outer joint member 15 and the hub wheel 1 can be separated from each other, and hence repair work for the constant velocity universal joint 6 or the hub wheel 1 can be easily performed. This repair work includes work for replacing any one of the constant velocity universal joint 6 and the hub wheel 1, which are included in the assembly body X. For example, in the bearing device for a driving wheel according to the first embodiment or the second embodiment, the repair work may be carried out in the following procedure.

In order to carry out this repair work, it is necessary to separate the constant velocity universal joint 6 and the hub wheel 1 from each other. In this case, as described above, in coupling between the outer joint member 15 of the constant velocity universal joint 6 and the hub wheel 1 by the recess-projection fitting structure, the outer joint member 15 and the hub wheel 1 can be separated from each other. Therefore, after detaching the snap ring 41, the stem section 27 of the outer joint member 15 can be pulled from the shaft hole 28 of the hub wheel 1.

Figure 16:
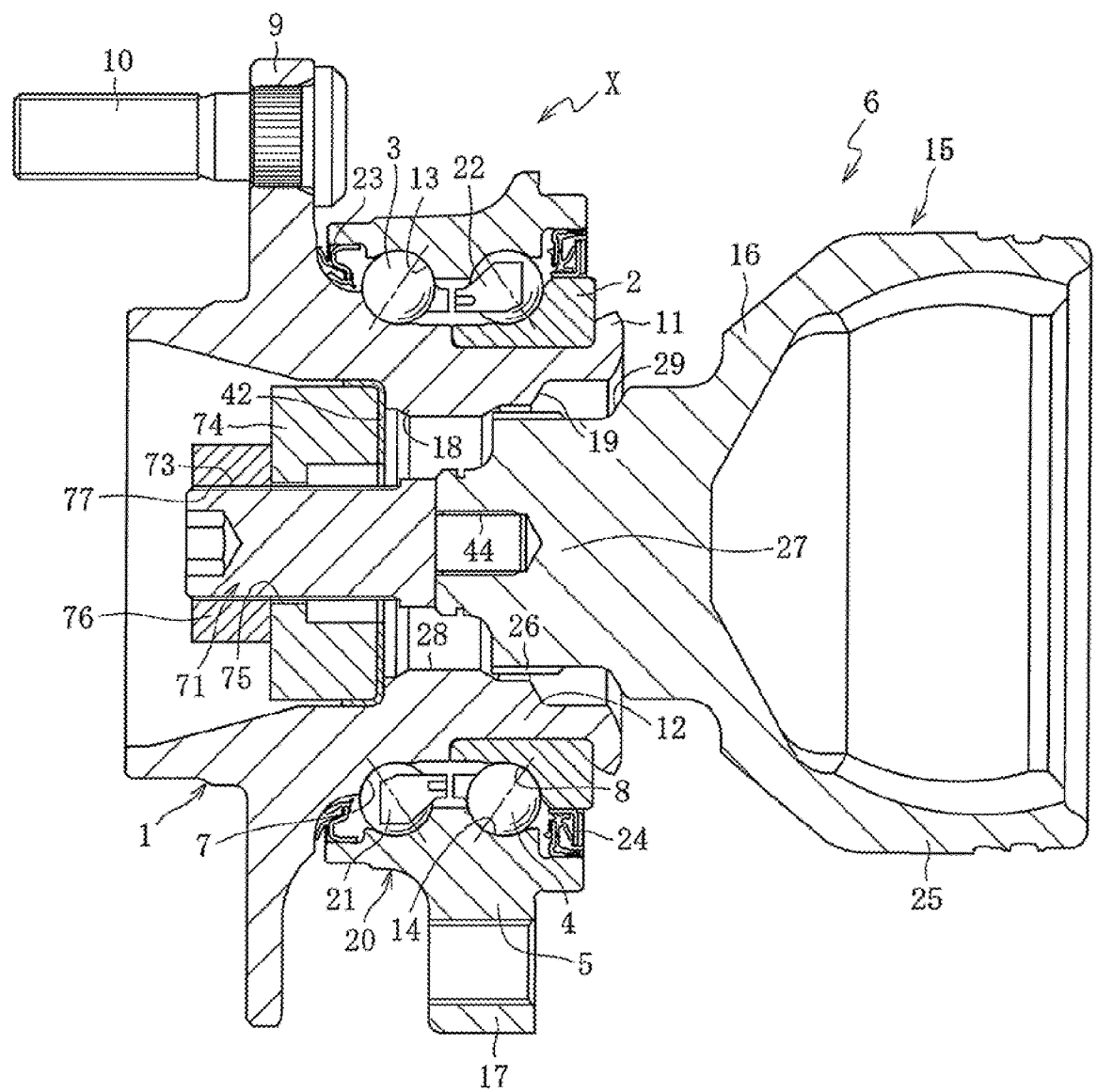
FIG. 16 is a sectional view of the outer joint member and the assembly body including the hub wheel before repress-fitting the stem section of the outer joint member into the hub wheel in the bearing device for a driving wheel of FIG. 2.
Figure 17:
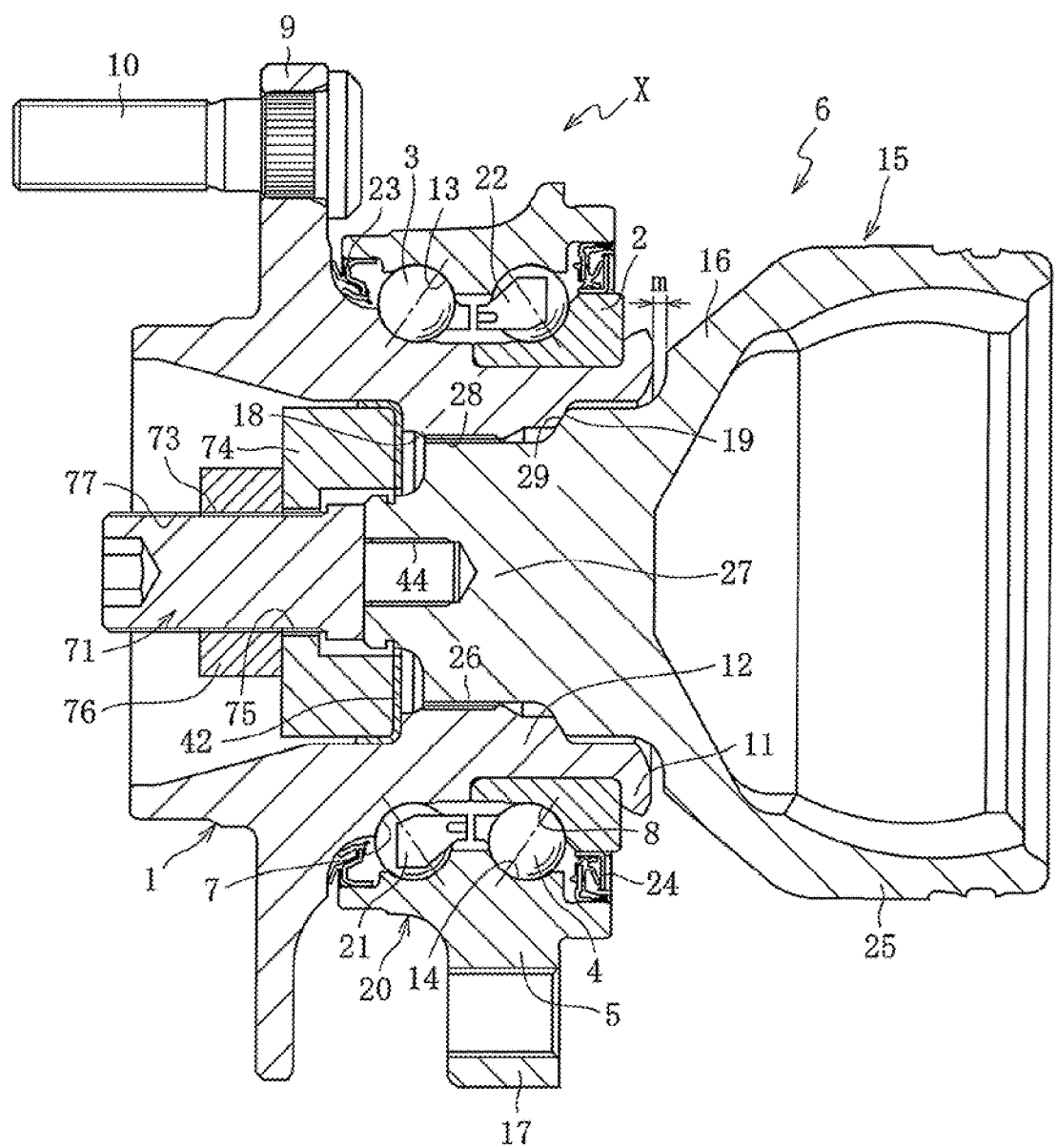
FIG. 17 is a sectional view of the outer joint member and the assembly body including the hub wheel after repress-fitting the stem section of the outer joint member into the hub wheel in the bearing device for a driving wheel of FIG. 2.

After pulling the stem section 27, with use of separate and dedicated jigs described below (extending stem, collar, and nut for drawing), the stem section 27 of the outer joint member 15 of a new constant velocity universal joint 6 is repress-fit into the shaft hole 26 of the hub wheel 1 of the reused assembly body X, or the stem section 27 of the outer joint member 15 of the reused constant velocity universal joint 6 is repress-fit into the shaft hole 28 of the hub wheel 1 of a fresh assembly body X. Note that, with use of the above-mentioned separate jigs, the stem section 27 can be easily repress-fit into the hub wheel 1. Note that, in the following, FIGS. 11 to 14 illustrate the first embodiment and FIGS. 15 to 17 illustrate the second embodiment, and there is exemplified the case in which the stem section 27 of the outer joint member 15 of the reused constant velocity universal joint 6 is repress-fit into the shaft hole 28 of the hub wheel 1 of the fresh assembly body X.

Figure 11:
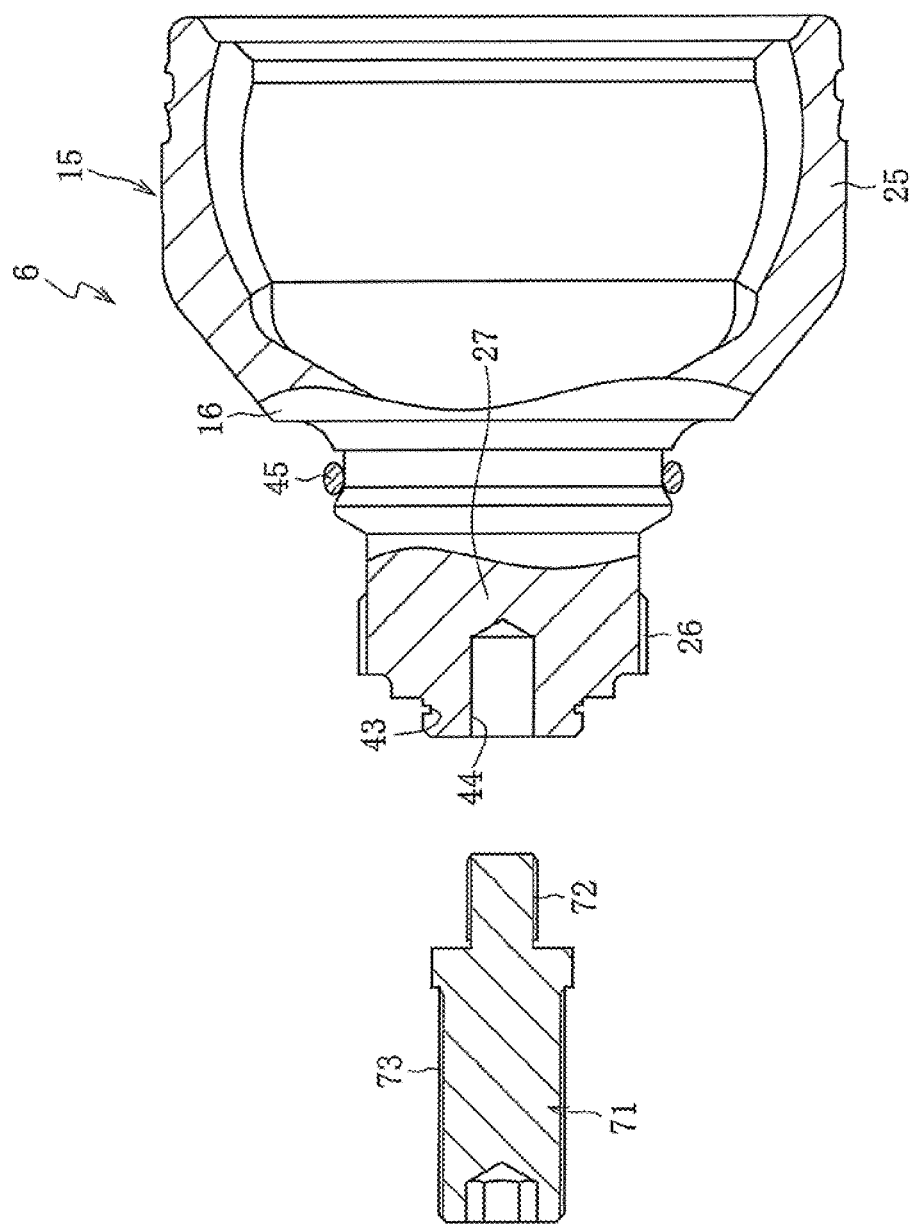
FIG. 11 is a sectional view of the outer joint member and a jig (extending stem) which is used when repress-fitting the stem section of the outer joint member into the hub wheel in the bearing device for a driving wheel of FIG. 1.
Figure 15:
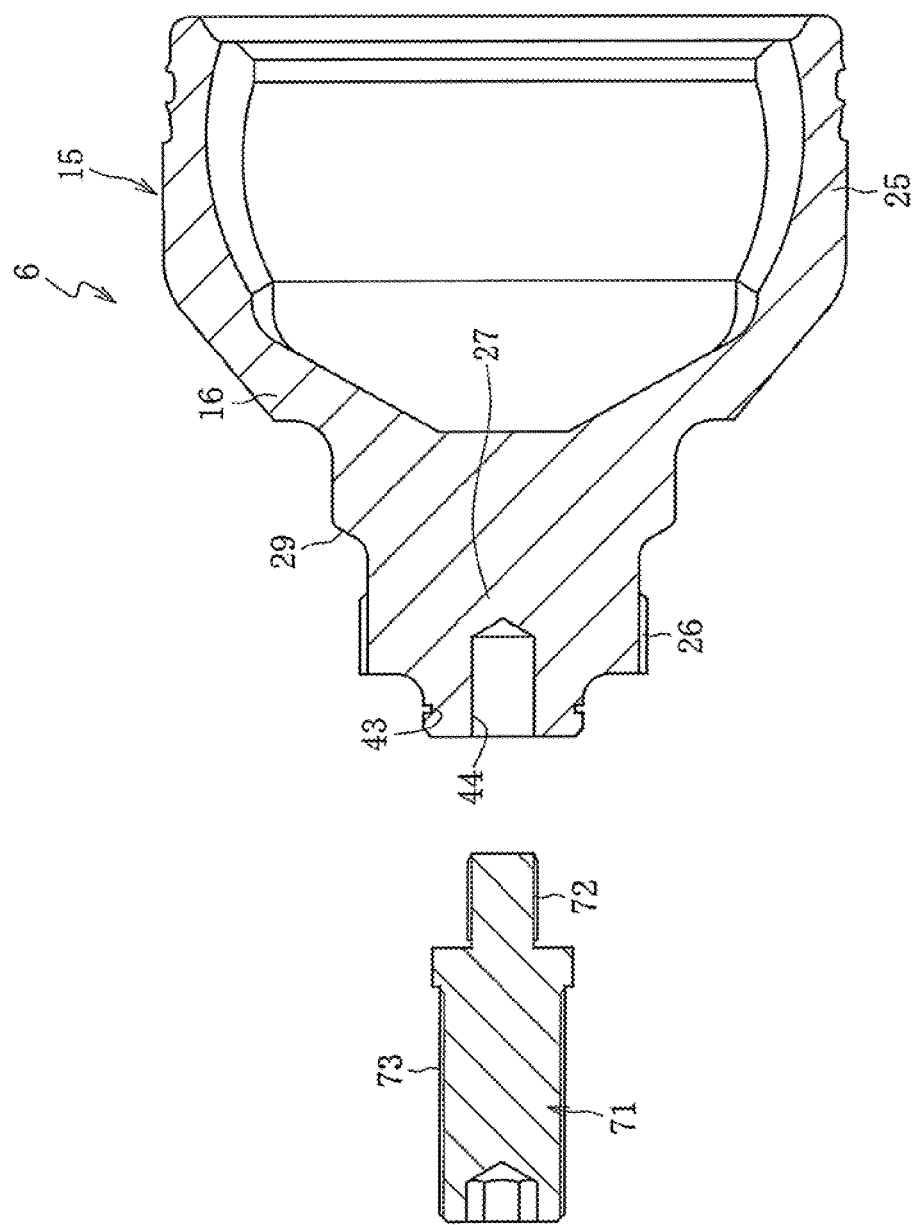
FIG. 15 is a sectional view of the outer joint member and the jig (extending stem) which is used when repress-fitting the stem section of the outer joint member into the hub wheel in the bearing device for a driving wheel of FIG. 2.

In this repress-fitting work, first, as illustrated in FIGS. 11 and 15, an extending stem 71 is mounted into the pin hole 44 of the stem section 27 of the outer joint member 15. The extending stem 71 is a jig having, at its one end, a male screw section 72 for connection which is screwed into the above-mentioned pin hole 44, and having a male screw section 73 for drawing which is formed on its outer peripheral surface. The extending stem 71 is provided so as to extend the stem section 27 having a small axial dimension to facilitate drawing work. The male screw section 72 for connection of the extending stem 71 is screwed into the pin hole 44 of the stem section 27. Note that, in the case of the first embodiment, at this point in time, the O-ring 45 is mounted in advance on the outer peripheral surface on the base of the stem section 27 of the outer joint member 15.

Figure 12:
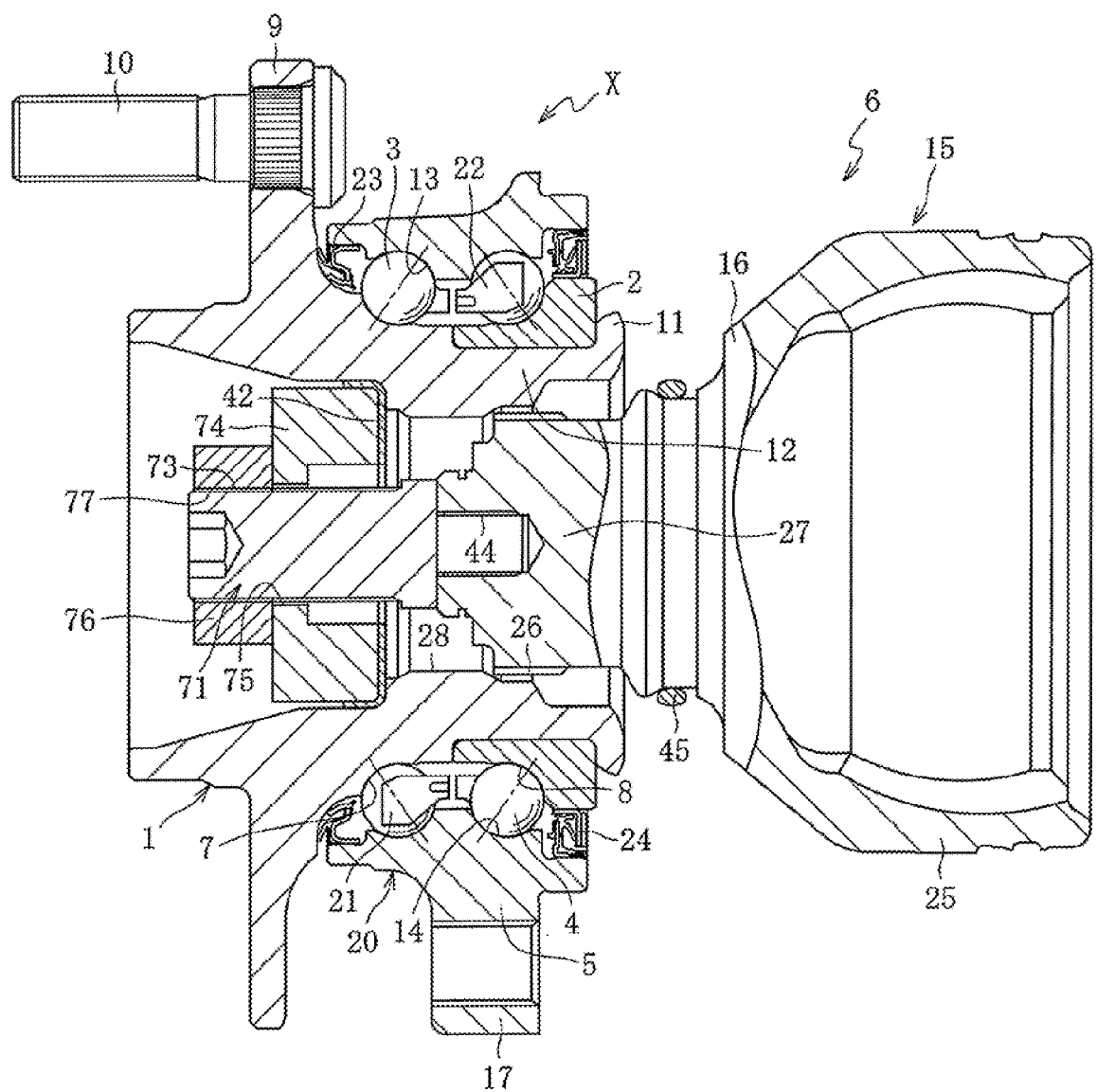
FIG. 12 is a sectional view of the outer joint member and an assembly body including the hub wheel before repress-fitting the stem section of the outer joint member into the hub wheel in the bearing device for a driving wheel of FIG. 1.
Figure 13:
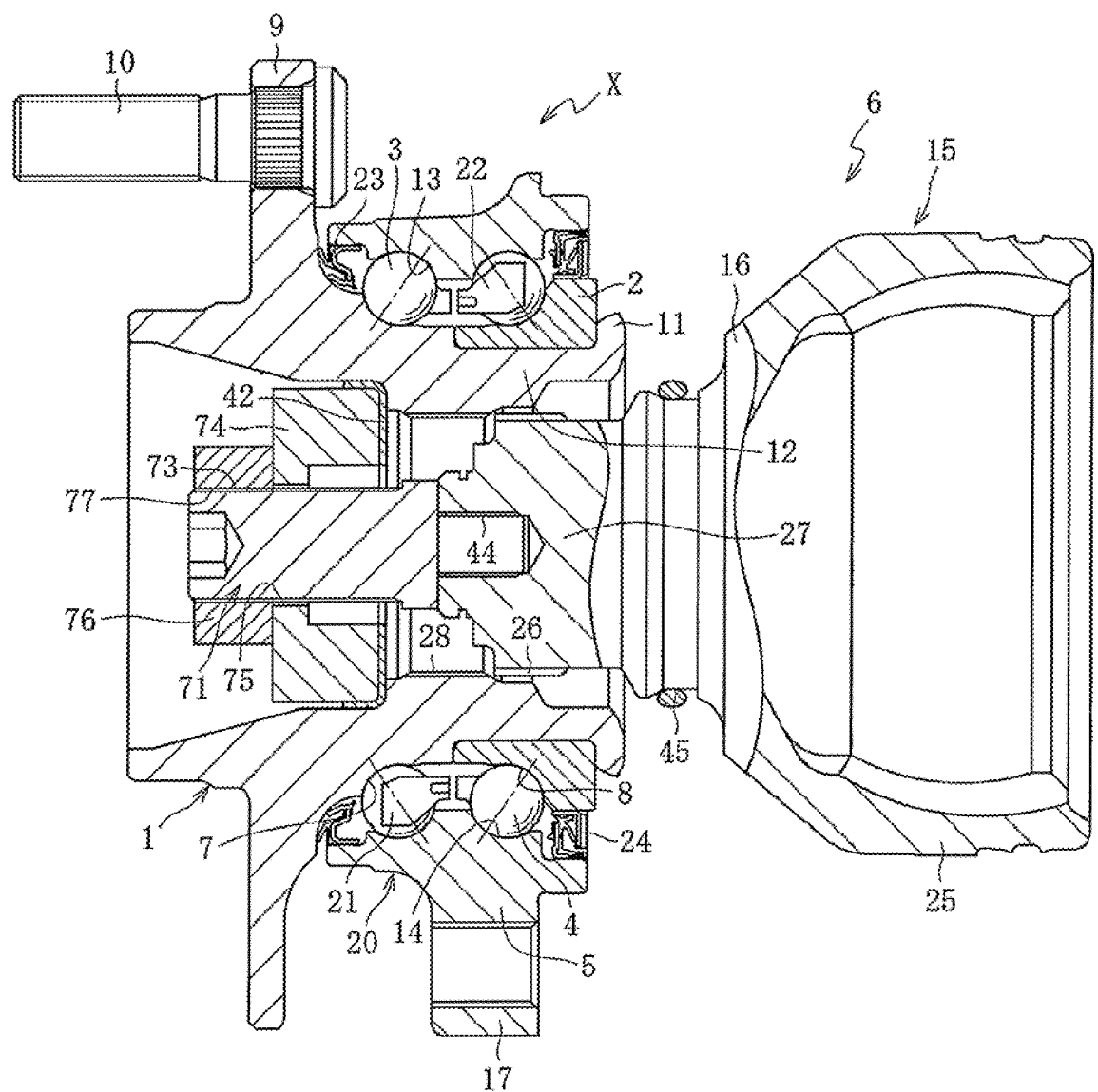
FIG. 13 is a sectional view of the outer joint member and the assembly body including the hub wheel in which recesses are formed in the shaft hole in advance before repress-fitting the stem section of the outer joint member into the hub wheel in the bearing device for a driving wheel of FIG. 1.

As illustrated in FIGS. 12 (or 13) and 16, the stem section 27 of the outer joint member 15, to which the above-mentioned extending stem 71 is mounted, is inserted and arranged into the shaft hole 28 of the hub wheel 1 of the assembly body X. Then, a collar 74 and a nut 76 for drawing are mounted onto the extending stem 71 inserted and arranged into the shaft hole 28 of the hub wheel 1. Note that, a difference between FIG. 12 and FIG. 13 is whether or not the female spline is formed in advance to the shaft hole 28 of the hub wheel 1. FIG. 13 exemplifies the case where the female spline is formed in advance to the shaft hole 28.

The collar 74 is a jig having a through hole 75 which is formed on its inner peripheral surface for drawing the extending stem 71. The collar 74 is provided so as to support the stem section 27 with respect to the hub wheel 1 through the intermediation of the extending stem 71. Further, the nut 76 is a jig having, on its inner peripheral surface, a female screw section 77 which is screwed onto the screw section 73 for drawing of the extending stem 71. The nut 76 is provided so as to draw the stem section 27 to the hub wheel 1 while using the collar 74 as a support base.

Figure 14:
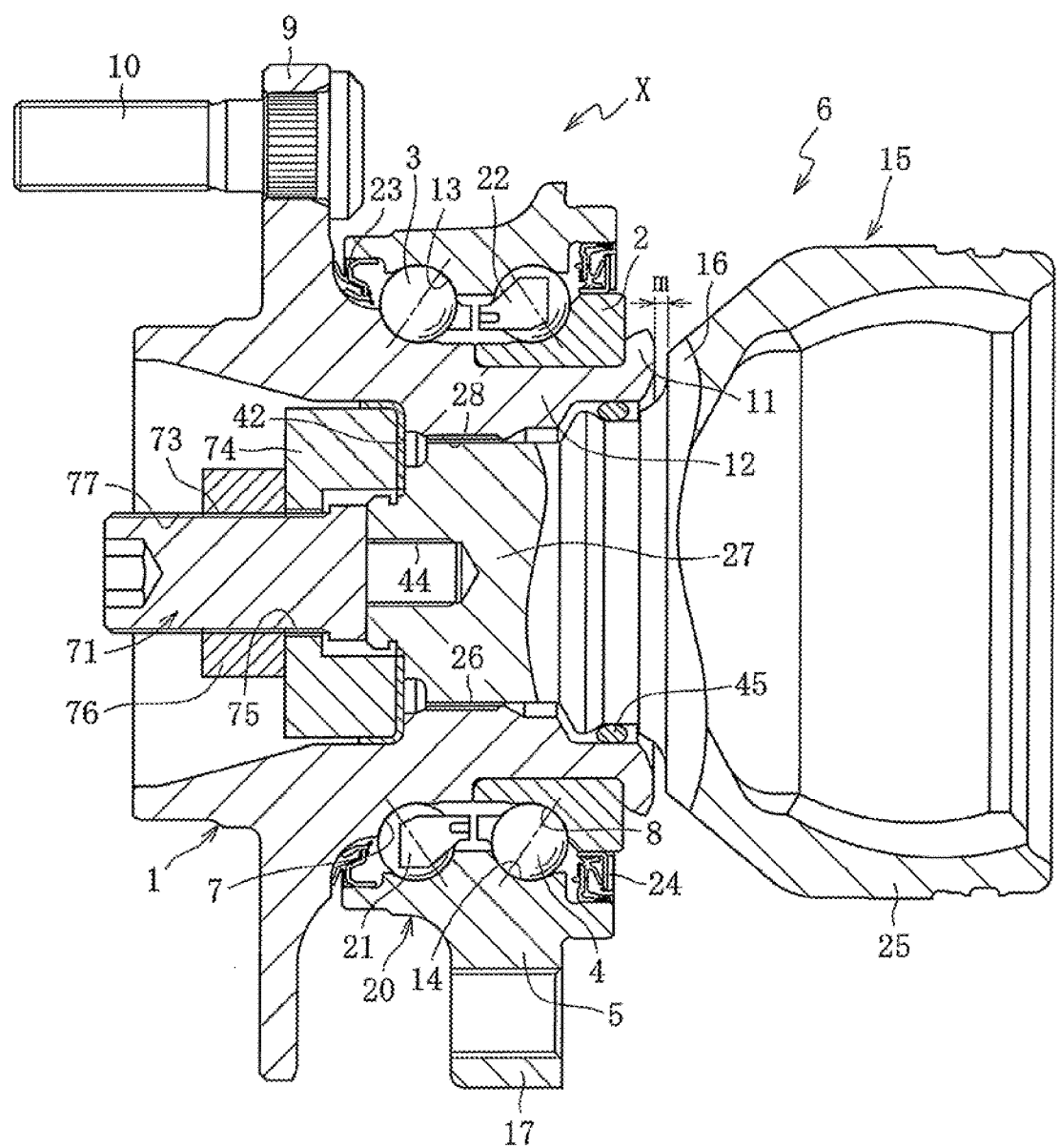
FIG. 14 is a sectional view of the outer joint member and the assembly body including the hub wheel after repress-fitting the stem section of the outer joint member into the hub wheel in the bearing device for a driving wheel of FIG. 1.

The extending stem 71 projecting from the outboard side of the shaft hole 28 of the hub wheel 1 is inserted through the collar 74, the collar 74 is brought into contact with the large-diameter step portion of the shaft hole of the hub wheel 1 through the intermediation of the cap 42, and movement of the extending stem 71 in a direction of coming, into contact with the stem section 27 is regulated. In this state, the nut 76 is screwed onto the above-mentioned extending stem 71. In addition in this state, the nut 76 is rotated in a fastening direction, whereby the stem section 27 of the outer joint member 15, which is connected through the intermediation of the extending stem 71, is drawn in a direction of coming into contact with the hub wheel 1 and is repress-fit into the shaft hole 28 of the hub wheel 1. Owing to this repress-fitting, it is possible to firmly couple the outer joint member 15 and the hub wheel 1 with each other by the above-mentioned recess-projection fitting structure. As illustrated in FIGS. 14 and 17, after repress-fitting of the stem section 27 into the hub wheel 1 is completed, the nut 76, the collar 74, and the extending stem 71 are detached therefrom, and the snap ring 41 is mounted to the stem section 27 again. As a result, the replacing work is completed (see FIGS. 1 and 2).

When replacement of the assembly body X is necessary at the time of repair work, the stem section 27 of the reused outer joint member 15 is repress-fit into the shaft hole 28 of the hub wheel 1 of the fresh assembly body X as described above. Consequently, the above-mentioned recess-projection fitting structure is reconfigured between the hub wheel 1 and the outer joint member 15, thereby coupling both the members. In this case, to the shaft hole 28 of the hub wheel 1 of the fresh assembly body X, there is formed in advance a female spline having interference with respect to the male spline 26 formed on the stem section 27 (female spline having a spline diameter smaller than that of the male spline, for example). Further, when replacement of the constant velocity universal joint 6 is necessary, there is prepared a new outer joint member 15 in which the male spline 26 having interference with respect to the recess-projection surfaces of the shaft hole 28 of the hub wheel 1 (male spline 26 which, when assuming that the recess-projection surfaces of the hub wheel 1 constitute a female spline, has a spline diameter larger than that of this female spline, for example) is formed to the stem section 27, and the stem section 27 of the new outer joint member 15 is repress-fit into the shaft hole 28 of the hub wheel 1 of the reused assembly body X. Consequently, the hub wheel 1 and the outer joint member 15 are coupled to each other in a preload state. Owing to this repress-fitting, it is possible to firmly couple the outer joint member 15 and the hub wheel 1 with each other by the above-mentioned recess-projection fitting structure. In this case, at the time of repress-fitting, phase alignment of the female spline of the hub wheel 1 and the male spline 26 of the stem section 27 is necessary. When there is replaced the assembly body X or the outer joint member 15, in which the female spline is formed on the inner peripheral surface of the hub wheel and press-fit to the stem section having a cylindrical surface, thereby configuring the recess-projection fitting structure, it is possible to deal with the replacement by the same procedure.

In the above description, there is described the case where the male spline 26 is formed on the stem section 27 of the outer joint member 15 and the shaft hole 28 of the hub wheel 1 is formed into a cylindrical surface. However, also in the case where the female spline is formed to the shaft hole 28 of the hub wheel 1 and the outer peripheral surface of the stem section 27 is formed into a cylindrical surface, the same procedure can be applied. That is, when replacement of the outer joint member 15 is necessary, the stem section 27 of the new outer joint member 15 is formed into a shape having interference with respect to the female spline of the hub wheel 1. In contract, when replacement of the assembly body X is necessary, the female spline having interference with respect the recess-projection surfaces formed on the stem section 27 is formed to the shaft hole 28 of the new hub wheel 1.

Figure 18:
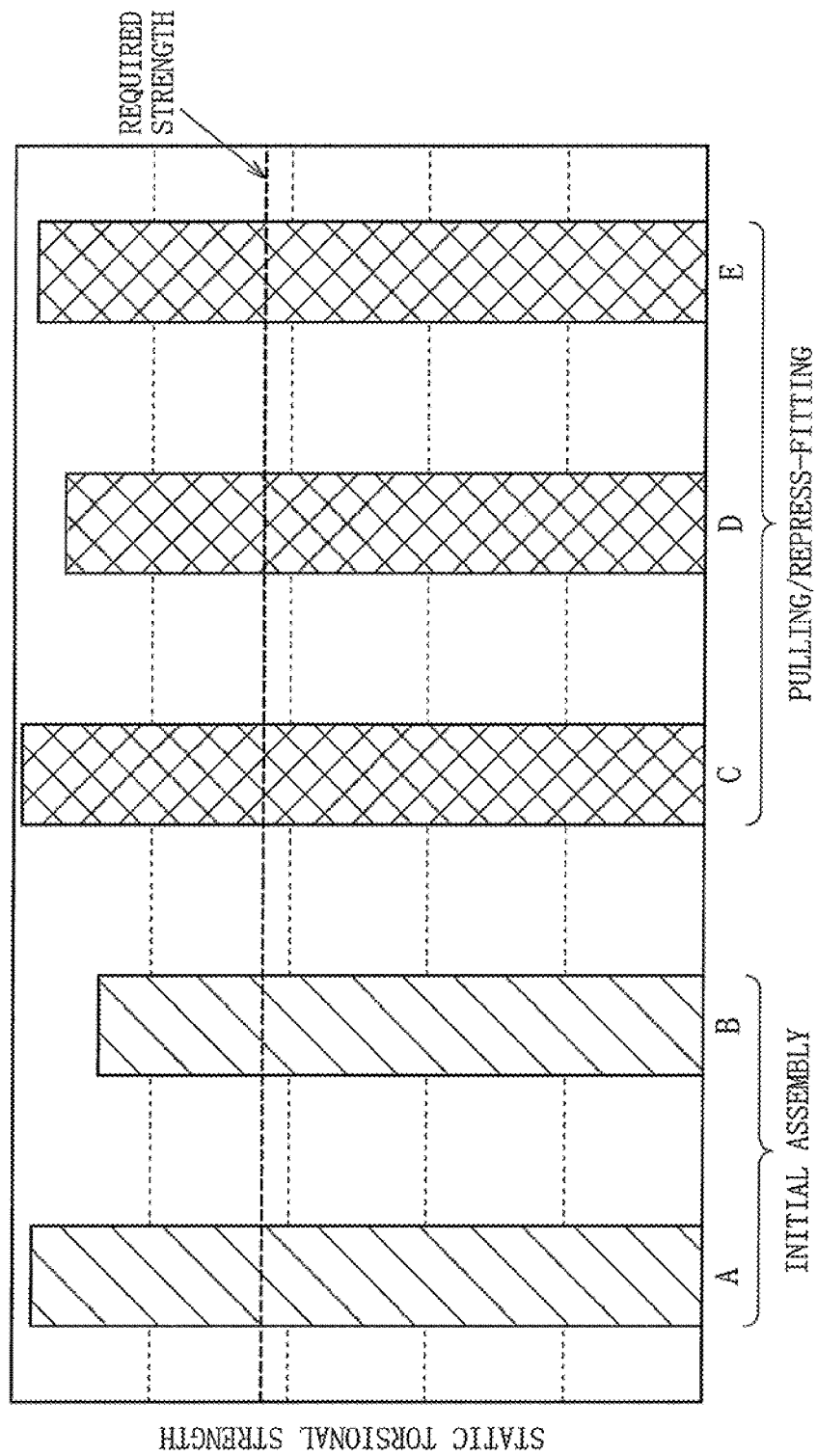
FIG. 18 is a graph for comparison of static torsional strength at the time of initial assembly and pulling/repress-fitting.
Figure 19:
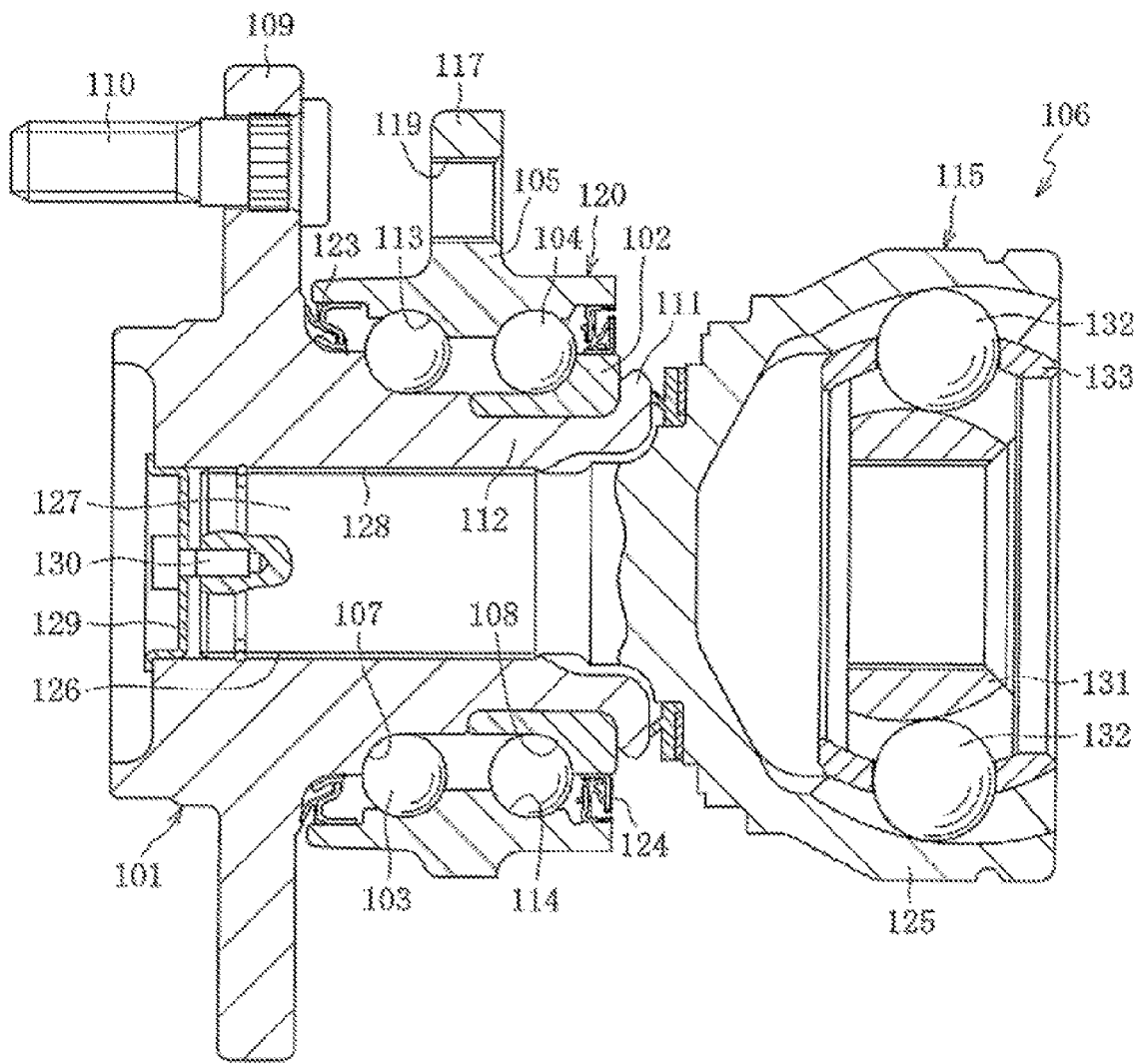
FIG. 19 is a sectional view of an example of a conventional bearing device for a driving wheel.

Note that, as illustrated in FIG. 18, the applicant of the present invention confirmed, with respect to static torsional strength in sample bodies A, B in which the stem section 27 of the outer joint member 15 was initially assembled to the hub wheel 1, static torsional strength in the sample bodies C, D, and E in which the stem section 27 of the outer joint member 15 was pulled from the hub wheel, and then repress-fit thereto was not decreased, and required strength therein was secured.

In the above-mentioned embodiments, there is exemplified the case where the present invention is applied to the bearing device for a driving wheel (referred to as third generation), in which one of the double-row inner raceway surfaces 7, 8 formed to the inner member including the hub wheel 1 and the inner race 2, that is, the inner raceway surface 7 on the outboard side is formed at the outer periphery of the hub wheel 1. However, the present invention is not limited thereto, and can be also applied to the bearing device for a driving wheel (referred to as first or second generation), in which a pair of inner races is press-fit to the outer periphery of the hub wheel, the raceway surface 7 on the outboard side is formed at the outer periphery of one of the inner races, and the raceway surface 8 on the inboard side is formed at the outer periphery of the other inner race.

The present invention is not limited to the above-mentioned embodiment, and can be made according to various embodiments without departing from the gist of the present invention. The scope of the present invention is specified by the scope of Claims, and includes meaning of equivalent described in the scope of Claims and modifications in the scope thereof.

The invention claimed is:

1. A bearing device for a driving wheel, comprising:
    an outer member having an inner periphery in which double-row outer raceway surfaces are formed;
    an inner member comprising a hub wheel provided with a flange to be attached to the driving wheel, and an inner race, and having an outer periphery in which double-row inner raceway surfaces are formed so as to oppose the outer raceway surfaces;
    double-row rolling elements interposed between the outer raceway surfaces of the outer member and the inner raceway surfaces of the inner member; and
    an outer joint member of a constant velocity universal joint having a stem section which is coupled to an inner surface of the hub wheel by a recess-projection fitting structure,
    wherein the recess-projection fitting structure includes a plurality of projections which are formed on one of the hub wheel and the stem section and extend in an axial direction, and a plurality of recesses which are formed in another one of the hub wheel and the stem section by press-fitting the projections thereinto so as to transfer shapes of the projections such that the recesses and the projections fit with interference at an entire fitting region thereof, the recesses having portions cut by the projections, respectively,
    wherein the hub wheel and the outer joint member coupled by the recess-projection fitting structure are separable from each other,
    and wherein an end surface of each projection on a side of the one of the hub wheel and the stem section at which press-fitting is started is brought into contact in the axial direction with the another one of the hub wheel and the stem section having the recesses while not being allowed to pass through the another one of the hub wheel and the stem section having the recesses.

2. A bearing device for a driving wheel according to claim 1, wherein the hub wheel has a caulked portion for preventing the inner race from slipping off of the hub wheel, the outer joint member has a shoulder section, and wherein the caulked portion of the hub wheel and the outer joint member are caused to abut against each other in the axial direction.

3. A bearing device for a driving wheel according to claim 2, wherein the stem section of the outer joint member is prevented from slipping off from the hub wheel by a locking member.

4. A bearing device for a driving wheel according to claim 1, wherein a surface hardness of the projections is set to be larger than a surface hardness of the recesses.

5. A bearing device for a driving wheel according to claim 4, wherein the projections are hardened by induction hardening.

6. A bearing device for a driving wheel according to claim 1, wherein the stem section of the outer joint member is prevented from slipping off from the hub wheel by a locking member.

7. A bearing device for a driving wheel according to claim 1, wherein a gap is provided between a joint-side end portion of the hub wheel and a hub wheel-opposed end portion of the outer joint member.

8. A bearing device for a driving wheel according to claim 1, wherein an outer peripheral surface of the outer member is fitted to a knuckle, and a minimum inner diameter dimension of a surface, which fits to the outer member, of the knuckle is set to be larger than a maximum outer diameter dimension of the constant velocity universal joint.

9. A reassembling method for a bearing device of a driving wheel, the bearing device comprising:
    an assembly body and an outer joint member of a constant velocity universal joint fitted into an inner surface of a hub wheel, the assembly body including
        an outer member having an inner periphery in which double-row outer raceway surfaces are formed,
        an inner member including the hub wheel provided with a flange to be attached to the driving wheel, and an inner race, and having an outer periphery in which double-row inner raceway surfaces are formed so as to oppose the outer raceway surfaces, and
        double-row rolling elements interposed between the outer raceway surfaces of the outer member and the inner raceway surfaces of the inner member,
    the outer joint member of the constant velocity universal joint having a stem section which is coupled to the inner surface of the hub wheel by a recess-projection fitting structure,
    the recess-projection fitting structure including a plurality of projections which are formed on one of the hub wheel and the stem section and extend in an axial direction, and a plurality of recesses which are formed in another one of the hub wheel and the stem section by press-fitting the projections thereinto so as to transfer shapes of the projections such that the recesses fit on the projections with interference, the recesses being formed by accompanying cutting by the projections, respectively, wherein an end surface of each projection on a side of the one of the hub wheel and the stem section at which press-fitting is started is brought into contact in the axial direction with the another one of the hub wheel and the stem section having the recesses while not being allowed to pass through the another one of the hub wheel and the stem section having the recesses, and the hub wheel and the outer joint member coupled by the recess-projection fitting structure are separable from each other, said reassembling method comprising:
    when the outer joint member is to be reused and the assembly body is to be replaced with a new assembly body, separating the hub wheel and the outer joint member; and
    after said separating of the hub wheel and the outer joint member, assembling the stem section of the reused outer joint member into an inner surface of a hub wheel of the new assembly body, thereby reconfiguring a recess-projection fitting structure including a plurality of projections and a plurality of recesses fitted on the projections with interference.

10. A reassembling method for a bearing device of a driving wheel according to claim 9, wherein, when the stem section of the reused outer joint member has the projections, under a state in which the recesses having the interference with respect to the projections are formed in the hub wheel of the new assembly body, the stem section of the outer joint member is assembled to the inner surface of the hub wheel of the new assembly body.

11. A reassembling method for a bearing device of a driving wheel according to claim 9, wherein, when the stem section of the reused outer joint member has the recesses, under a state in which the projections having the interference with respect to the recesses are formed in the hub wheel of the new assembly body, the stem section of the outer joint member is assembled to the inner surface of the hub wheel of the new assembly body.

12. A reassembling method for a bearing device of a driving wheel according to claim 9, wherein said assembling of the stem section of the reused outer joint member into the inner surface of the hub wheel of the new assembly body comprises drawing the reused outer joint member in a direction of coming closer to the hub wheel of the new assembly body by a jig, movement of the jig being regulated in a direction of coming closer to the constant velocity universal joint by the hub wheel of the new assembly body, such that the stem section of the reused outer joint member is press-fitted into the inner surface of the hub wheel of the new assembly body.

13. A reassembling method for a bearing device of a driving wheel, the bearing device comprising:
an assembly body and an outer joint member of a constant velocity universal joint fitted into an inner surface of a hub wheel, the assembly body including
an outer member having an inner periphery in which double-row outer raceway surfaces are formed,
an inner member including the hub wheel provided with a flange to be attached to the driving wheel, and an inner race, and having an outer periphery in which double-row inner raceway surfaces are formed so as to oppose the outer raceway surfaces, and
double-row rolling elements interposed between the outer raceway surfaces of the outer member and the inner raceway surfaces of the inner member,
the outer joint member of the constant velocity universal joint having a stem section which is coupled to the inner surface of the hub wheel by a recess-projection fitting structure,
the recess-projection fitting structure including a plurality of projections which are formed on one of the hub wheel and the stem section and extend in an axial direction, and a plurality of recesses which are formed in another one of the hub wheel and the stem section by press-fitting the projections thereinto so as to transfer shapes of the projections such that the recesses fit on the projections with interference, the recesses being formed by accompanying cutting by the projections, respectively, wherein an end surface of each projection on a side of the one of the hub wheel and the stem section at which press-fitting is started is brought into contact in the axial direction with the another one of the hub wheel and the stem section having the recesses while not being allowed to pass through the another one of the hub wheel and the stem section having the recesses, and the hub wheel and the outer joint member coupled by the recess-projection fitting structure are separable from each other, said reassembling method comprising:
when the assembly body is to be reused and the outer joint member is to be replaced with a new outer joint member, separating the hub wheel and the outer joint member; and
after said separating of the hub wheel and the outer joint member, assembling a stem section of the new outer joint member into the inner surface of the hub wheel of the reused assembly body, thereby reconfiguring a recess-projection fitting structure including a plurality of projections and a plurality of recesses fitted on the projections with interference.

14. A reassembling method for a bearing device of a driving wheel according to claim 13, wherein, when the hub wheel of the reused assembly body has the projections, the stem section of the new outer joint member is assembled to the inner surface of the hub wheel under a state in which the recesses having the interference with respect to the projections are formed in the stem section of the new outer joint member.

15. A reassembling method for a bearing device of a driving wheel according to claim 13, wherein, when the hub wheel of the reused assembly body has the recesses, the stem section of the new outer joint member is assembled to the inner surface of the hub wheel under a state in which the projections having the interference with respect to the recesses are formed in the stem section of the new outer joint member.

16. A reassembling method for a bearing device of a driving wheel according to claim 13, wherein said assembling of the stem section of the new outer joint member into the inner surface of the hub wheel of the reused assembly body comprises drawing the new outer joint member in a direction of coming closer to the hub wheel by a jig, movement of the jig being regulated in a direction of coming closer to the constant velocity universal joint by the hub wheel, such that the stem section of the new outer joint member is press-fitted into the inner surface of the hub wheel of the reused assembly body.

* * * * *